United States Patent
Millman, Jr. et al.

(10) Patent No.: US 8,410,394 B2
(45) Date of Patent: *Apr. 2, 2013

(54) METHOD AND APPARATUS FOR PROCESSING SUBSTRATE EDGES

(75) Inventors: Ronald P. Millman, Jr., Taunton, MA (US); Kenneth J. Harte, Carlisle, MA (US); Victoria M. Chaplick, Charlton, MA (US); David J. Elliott, Carlisle, MA (US); Murray L. Tardif, Dunstable, MA (US); Eugene O. Degenkolb, Newton, MA (US)

(73) Assignee: UVTech Systems, Inc., Sudbury, MA (US)

( * ) Notice: Subject to any disclaimer, the term of this patent is extended or adjusted under 35 U.S.C. 154(b) by 17 days.

This patent is subject to a terminal disclaimer.

(21) Appl. No.: 13/034,191

(22) Filed: Feb. 24, 2011

(65) Prior Publication Data

US 2011/0139757 A1    Jun. 16, 2011

Related U.S. Application Data

(63) Continuation of application No. 12/986,914, filed on Jan. 7, 2011.

(60) Provisional application No. 61/293,325, filed on Jan. 8, 2010, provisional application No. 61/419,602, filed on Dec. 3, 2010.

(51) Int. Cl.
*B23K 26/14* (2006.01)
*B23K 26/16* (2006.01)

(52) U.S. Cl. ......... 219/121.67; 219/121.68; 219/121.69; 219/121.76

(58) Field of Classification Search ............. 219/121.69, 219/121.68, 121.84, 121.86, 121.76, 121.67
See application file for complete search history.

(56) References Cited

U.S. PATENT DOCUMENTS

| 5,302,547 A | 4/1994 | Wojnarowski et al. |
| 5,392,989 A | 2/1995 | Hurtig |

(Continued)

OTHER PUBLICATIONS

Rinnen, K., et al., "Forecast: Semiconductor Wafer Fab Equipment, Worldwide, 4Q07 Update," Gartner Dataquest, Gartner, Inc. Fab Database: Worldwide, 2009, 25 pages (2007).

(Continued)

*Primary Examiner* — Henry Yuen
*Assistant Examiner* — Eric Stapleton
(74) *Attorney, Agent, or Firm* — Cesari and McKenna, LLP

(57) ABSTRACT

A method and apparatus for processing substrate edges is disclosed that overcomes the limitations of conventional edge processing methods and systems used in semiconductor manufacturing. The edge processing method and apparatus of this invention includes a laser and optical system to direct a beam of radiation onto a rotating substrate supported by a chuck. The optical system accurately and precisely directs the beam to remove or transform organic or inorganic films, film stacks, residues, or particles, in atmosphere, from the top edge, top bevel, apex, bottom bevel, and bottom edge of the substrate in a single process step. An optional gas injector system directs gas onto the substrate edge to aid in the reaction. Reaction by-products are removed by means of an exhaust tube enveloping the reaction site. This invention permits precise control of an edge exclusion width, resulting in an increase in the number of usable die on a wafer. Wafer edge processing with this invention replaces existing methods that use large volumes of purified water and hazardous chemicals including solvents, acids, alkalis, and proprietary strippers.

22 Claims, 23 Drawing Sheets

U.S. PATENT DOCUMENTS

| | | |
|---|---|---|
| 6,406,589 B1 | 6/2002 | Yanagisawa |
| 6,482,199 B1 | 11/2002 | Neev |
| 6,495,312 B1 | 12/2002 | Young et al. |
| 6,508,990 B1 | 1/2003 | Yoshida et al. |
| 6,635,844 B2 * | 10/2003 | Yu .................. 219/121.68 |
| 6,676,878 B2 * | 1/2004 | O'Brien et al. ........... 264/400 |
| 6,874,510 B2 | 4/2005 | Reder et al. |
| 6,881,687 B1 | 4/2005 | Castrucci |
| 7,170,912 B2 | 1/2007 | Chen |
| 7,182,821 B2 | 2/2007 | Izumi et al. |
| 7,267,726 B2 | 9/2007 | Xia |
| 7,270,136 B2 | 9/2007 | Ko et al. |
| 7,460,211 B2 | 12/2008 | Whitefield et al. |
| 7,528,342 B2 | 5/2009 | Deshi |
| 7,651,585 B2 | 1/2010 | Yoon et al. |
| 7,745,095 B2 | 6/2010 | Wong et al. |
| 2003/0154001 A1 | 8/2003 | Oh |
| 2004/0126923 A1 | 7/2004 | Benson |
| 2006/0278254 A1 | 12/2006 | Jackson |
| 2007/0093067 A1 | 4/2007 | Chang et al. |
| 2007/0138151 A1 | 6/2007 | Tanaka et al. |
| 2007/0176084 A1 | 8/2007 | Shyu et al. |
| 2008/0010845 A1 * | 1/2008 | Bailey et al. ................ 33/520 |
| 2008/0073324 A1 * | 3/2008 | Nogami et al. ............... 216/58 |
| 2008/0277061 A1 * | 11/2008 | Kobayashi et al. ......... 156/345.5 |
| 2008/0289651 A1 | 11/2008 | Cheng et al. |
| 2008/0314879 A1 | 12/2008 | Bruland et al. |
| 2009/0029629 A1 | 1/2009 | Shin et al. |
| 2009/0038637 A1 | 2/2009 | LeClaire et al. |
| 2009/0044831 A1 | 2/2009 | Yudovsky et al. |
| 2010/0051073 A1 * | 3/2010 | Iwase et al. ................. 134/56 R |
| 2010/0099265 A1 | 4/2010 | Yoon et al. |
| 2010/0147327 A1 * | 6/2010 | Kondo et al. ................. 134/1 |
| 2010/0190416 A1 | 7/2010 | Schwarzenbach et al. |
| 2010/0285399 A1 | 11/2010 | Huang et al. |

OTHER PUBLICATIONS

Singer, P., et al., "How Green is Your Valley," Solid State Technology, Editorial, Mar. 2009.

Handbook of Semiconductor Cleaning Technology, Ed. Werner Kern, ISBN 0-8155-1331-3, p. 20 (1993).

International Search Report and Written Opinion of PCT/US11/62832 dated Jan. 24, 2012.

International Search Report from PCT/US11/00036 dated Dec. 19, 2011.

* cited by examiner

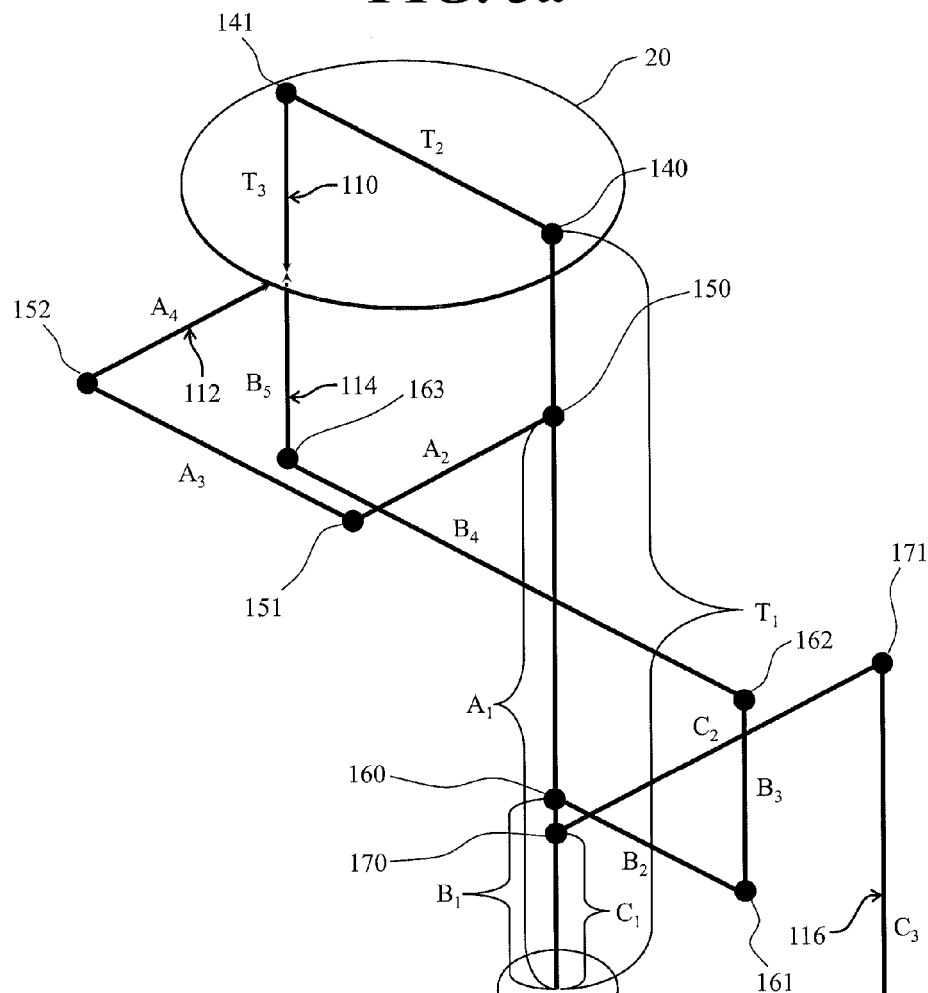
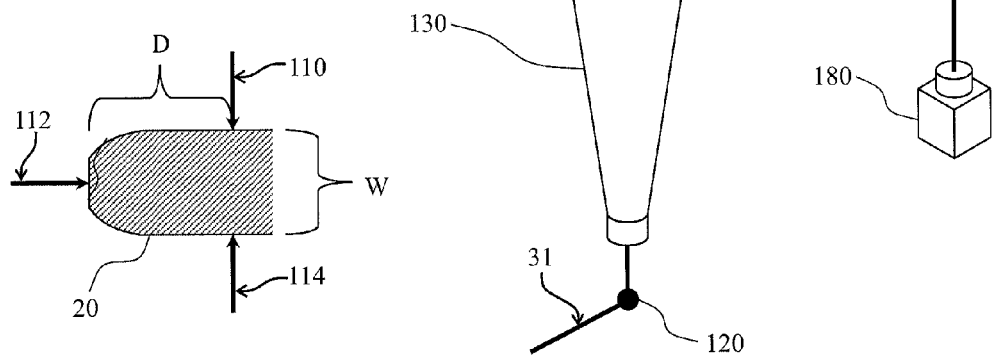

Top View

*Top View*

*Closed Position*

*Open Position*

*Present Invention*

METHOD AND APPARATUS FOR PROCESSING SUBSTRATE EDGES

RELATED APPLICATION(S)

This application is a continuation of U.S. application Ser. No. 12/986,914 filed Jan. 7, 2011, which claims the benefit of U.S. Provisional Application No. 61/293,325, filed on Jan. 8, 2010 and U.S. Provisional Application No. 61/419,602, filed on Dec. 3, 2010. The entire teachings of the above applications are incorporated herein by reference.

TECHNICAL FIELD

This patent application generally relates to wafer processing in the manufacture of integrated circuits, and to a method and apparatus for removal of films from semiconductor substrates at various stages of processing. It specifically relates to a laser-based edge processing system for the removal of organic, inorganic, and other semiconductor films from the edges of silicon wafers or other substrates. These films are removed in order to reduce the number of defects generated around the periphery of the wafers that cause loss of good die in integrated circuit manufacturing.

BACKGROUND OF THE INVENTION

In the fabrication of semiconductors, a number of different types of unwanted films, particles, and residues are formed or are left on the edges of silicon wafers. The relevant edges include the top (or front), top bevel, apex (or sidewall), bottom bevel, and bottom (or back) edges of wafers (hereinafter "wafer edges"). These edges are further specified in the International Standards published by Semiconductor Equipment and Materials International (SEMI) of San Jose, Calif. and referred to as the SEMI M1-1109 and SEMI M73-0309 specification documents.

Many types of processes are used that result in such unwanted materials, including photoresist coating, plasma etching, dielectric and metal deposition, wet etching, grinding, and chemical mechanical polishing (CMP). These processes all result in various films, residues, and particles being deposited or left on the wafer edges.

The unwanted materials on wafer edges may be organic polymer films, such as photoresist edge beads, or residues, such as post-etch polymer films that remain on the edge of a wafer after a plasma etching operation. Other types of unwanted materials on wafer edges include metals, 'black silicon', silicon particles, and polishing residues.

During semiconductor manufacturing, wafers are transported from one tool to another in cassettes, and once loaded into a tool, are moved between process stations with robots handlers. As a consequence, films at the very edges of wafers become abraded, cracked, and broken. Cracked film fragments and particles contaminate vacuum chucks, robotic handlers, and cassettes, causing tool down time and die yield loss. Backside wafer contamination may distort or tilt the wafer during subsequent imaging, also causing yield loss.

Another source of wafer edge defects is the formation of a photoresist edge bead, caused when the wafers are spin coated prior to lithographic imaging. Photoresist spin coating is repeated many times in the fabrication of an integrated circuit chip, depending on the number of lithographic levels used to make the device. A thickened bead of photoresist is formed at the outermost top edge. Excess photoresist also migrates to the apex, beveled edges, and bottom edge of the wafer. The photoresist bead on the edge is easily cracked by robots handling the wafers, resulting in flakes of photoresist re-depositing on good die, causing yield loss. Any photoresist remaining on the wafer's bottom edge also sticks to vacuum chucks, causing leveling and distortion problems in lithography, and creating more cracked flakes of photoresist. Two methods are currently used for the removal of photoresist edge bead films. The first method is called wafer edge exposure and development (WEE), a two-step process described below in a prior art patent. The second conventional method for photoresist removal from wafer edges is solvent spraying or solvent cleaning.

Another example is residue left behind from plasma etching. These etch residues are thin, tough films such as halogenated polymers. They are deposited mainly on the wafer's bevel, apex, and bottom edges. They cannot be removed by conventional wet chemical means, and are currently removed with a grinder, in combination with a fluid to make a slurry. This is a messy and particle-generating process that leaves many defects behind. If these etch residues are not removed, they will crack, break up and leave particles on otherwise usable portions of the wafer, causing die loss.

Another example of an edge-cleaning problem is the removal of copper films from wafer edges, left over from copper metallization and etching steps. Remaining copper films on the wafer edges will cause electrical shorting and arcing during subsequent wafer processing steps. Copper films left on wafer edges must removed by a complex etching operation, for example wet etching followed by high purity water rinsing and drying steps.

Another edge cleaning problem is the treatment of 'black silicon' needle-like structures that are the result of a reactive ion etch (RIE) process. These structures are currently removed by a wet-etch process using hydrofluoric acid, followed by high purity water rinsing and drying steps.

Another example of an edge cleaning problem is the generation of silicon particles from edge thinning operations, commonly used in 3D interconnect devices. Grinding with abrasive wheels leaves large ridges of silicon that interfere with wafer-to-wafer bonding operations. Currently, the only method of removing these ridges is by chemical etching with hydrofluoric acid and water rinsing.

Another example of an edge-cleaning problem is defects resulting from chemical-mechanical polishing (CMP) residue. CMP slurries flow around the apex of wafers and onto the bottom edges. These residues and particles migrate onto vacuum chucks, robotic handlers, and other wafer processing equipment, again leading to die loss.

Yet another example of an edge-cleaning problem arises from the use of silicon-containing photoresist such as in tri-layer film stacks, consisting of an organic polymer layer, a carbon-based layer, and a silicon-containing layer. The silicon content can typically be up to 50% of the polymer content, and conventional removal methods, such as wafer edge exposure and development (WEE) or solvent cleaning, will not completely remove these silicon based films. Removal of silicon layers is currently performed in an etching operation with a reactive ion etcher system using fluorinated gas mixtures, followed by considerable water rinsing and drying steps.

PROBLEMS WITH THE PRIOR ART

There are many film types to be removed from wafer edges, each requiring specific cleaning methods. Wafer edge processing in semiconductor manufacturing requires many different types of chemicals and tools, and is therefore complex and costly. Each of these conventional methods is described in more detail below with reference to specific prior art.

One example of a problem with the prior art relates to a method for dispensing liquid in a solvent-based edge cleaning process, as described in U.S. Pat. No. 5,392,989 and U.S. Patent Application Publication No. 2010/0051073 A1. This problem relates to the inability of the liquid solvent to control the geometry of the cleaned edge. The cleaning fluid is dispensed and spreads on the wafer surface, leaving a tapered edge of photoresist that may be several millimeters wide. The width of the area on the periphery of the wafer lost due to edge cleaning is called the 'edge exclusion'. The International Technology Roadmap for Semiconductors (ITRS) specifies the parameters for integrated circuit production into the future, and the semiconductor industry companies follow this path. The ITRS specifies a reduction of the edge exclusion from the current 3-5 mm to below 1 mm in the future. Solvent-based edge cleaning cannot currently meet this specification due to the inability to effectively control the solvents. This inability includes solvent splashing onto good die causing yield loss. Organic solvents, such as ethyl lactate or cellosolve acetate, cause environmental problems, raise safety concerns, and are costly to use. Finally, after solvent edge cleaning, a thin residue of photoresist is typically left behind, requiring further chemical processing and rinsing to remove.

Another example of a problem with the prior art relates to etching the edge of a wafer in a chamber with acids, as described in U.S. Pat. No. 7,267,726 B2 and U.S. Pat. No. 7,182,821 B2. Some of the acids used are hydrofluoric (HF), sulfuric ($H_2SO_4$), and nitric ($HNO_3$). These chemicals are hazardous to use and require the use of complex and costly equipment, raising environmental problems and safety concerns. As with the solvent method listed above, it is difficult to effectively control the width of the edge exclusion zone. This method is specifically used to remove metal films, but due to the non-uniformity of these films at the edge of the wafer, it is difficult to control the etch depth. This method is also used for removing Teflon-like particles, but is not effective for removing photoresists.

Another example of a problem with the prior art relates to photoresist edge bead exposure and development (WEE), as described in U.S. Pat. No. 6,495,312 B1, U.S. Pat. No. 7,460,211 B2, and U.S. Patent Application Publication No. 2010/0285399 A1. This method requires two pieces of equipment to remove the photoresist edge bead: an exposure source, which is a high intensity lamp, and a separate wet developing system that uses an alkaline developer followed by a single or double rinse with high purity water. Since multiple pieces of equipment are used, this increases the time to complete the process, reducing throughput. The exposure step is often not adequate in removal of very thick edge beads; therefore a solvent cleaning process step is required. This method addresses photoresist edge beads, but there are many other types of more difficult films, such as post-etch polymers, that need to be removed, but cannot be addressed with WEE. Finally, since WEE only removes films from the top edge of the wafer, the apex and bottom edge must be cleaned by another method.

Another example of a problem with the prior art relates to a lithographic masking method, as described in U.S. Patent Application Publication No. 2007/0093067 A1 and U.S. Pat. No. 7,745,095 B2. This method is complex in that at least four individual steps are required to clean the wafer edge. Steps may include pre-cleaning, depositing and removing of organic coatings, lithographic exposure, developing, rinsing, and drying. This method requires multiple pieces of expensive equipment, consumes considerable volumes of solvent and water, and reduces throughput.

Another example of a problem with the prior art relates to a method using reactive plasma, as described in U.S. Pat. No. 7,651,585 B2 and U.S. Patent Application Publication No. 2010/0099265 A1. This method requires a complex plasma-etching tool using a vacuum chamber and reactive gases. The plasma is a non-uniform field of energetic ions surrounding the edge of the wafer; thus there is a gradient in the film being removed instead of a sharply defined edge. The width of the gradient adds to the edge exclusion zone, thereby reducing the usable die area. The complexity of the tool, as well as the vacuum chamber pump time, adds considerable cost and limits throughput.

Another example of a problem with the prior art relates to mechanical methods for cleaning wafer edges as described in U.S. Patent Application Publication No. 2010/0190416 A1 and U.S. Patent Application Publication No. 2009/0029629 A1. Chemical mechanical polishing (CMP) uses an abrasive polishing pad and wet chemicals to polish the wafer. The by-product of this process is a polishing slurry residue left on the bottom and edges of the wafer. The current method for removing this slurry residue is frictional surface cleaning, as described in U.S. Patent Application Publication No. 2009/0044831 A1. This method leads to loss of usable die due to particle generation.

Another example of a problem with the prior art relates to the use of frozen carbon dioxide particles to clean wafer edges, as described in U.S. Pat. No. 7,270,136 B2. The problems with this method are that the equipment used to perform this process is highly complex and expensive, and the impact of the frozen particles can cause damage to the substrate and to otherwise usable die.

Another example of a problem with the prior art relates to applying a flame to the edge of a wafer in the presence of reactive gasses including halogens and ozone, as described in U.S. Patent Application Publication No. 2008/0010845 A1. For example, a hydrogen-rich flame with oxygen and nitrogen trifluoride ($NF_3$) produces hydrogen fluoride (HF) that etches the edge of the wafer. Nitrogen trifluoride is a highly toxic and expensive gas that is typically used to clean deposition chambers in semiconductor manufacturing. Further, this method may require pre-heating the wafer to prevent condensation of the by-products onto the wafer, causing die loss. The apparatus described is very complex since the gas plumbing and safety requirements are extreme for the types of gases proposed for this edge cleaning method. Lastly, the method cannot remove films from all wafer edges in a single step and is not effective for photoresist removal.

Another example of a problem with the prior art relates to the use of a pressurized stream of a non-solvent medium, which may be a gas, to clean wafer edges, as described in U.S. Patent Application Publication No. 2004/0126923 A1. An expected problem with this method would be the scattering of particles onto the usable areas of the wafer, as well as the surrounding equipment. Additionally, this patent application claims that the medium must not be a solvent for the material being removed, which severely limits use on a variety of films due to its non-reactive nature.

Finally, another example of a problem with the prior art relates to the method of using an oblique-angled nozzle containing a laser beam combined with inert gas, as described in U.S. Pat. No. 6,874,510 B2. One problem with this method is that the beam used to clean the wafer edge is inside the gas delivery nozzle, such that the gas cannot be independently directed to prevent material from falling onto the good die toward the center of the wafer. Such laser reactions create a cloud of debris. If the gas nozzle is not positioned to remove this cloud away from the center of the wafer, debris will re-deposit onto good die causing yield loss. This prior art uses a chamber, which further complicates the process of removing the debris, as it becomes confined in the chamber, and can re-deposit onto the wafer as well as build-up on the chamber walls. Another problem with this prior art method is that the gas used is inert, and therefore does not permit reaction with films on the wafer edges. Yet another problem with this prior art is that this method shows cleaning only on the top surface. However, if a source of this type were redirected to the apex, the reaction by-products would be blown onto the good die at the center of the wafer, causing significant die loss. Still another problem with this prior art is that it requires the laser beam to impinge on the wafer edge at an oblique angle, introducing several problems including beam distortion and focusing issues at the wafer plane.

Due to the limitations of current edge cleaning methods, otherwise usable space on the periphery of a wafer is consumed. As an example, with a die size of 7.5 mm×7.5 mm, increasing the usable space on a 300 mm wafer by decreasing the edge exclusion width from 5.0 mm to 0.6 mm results in a potential gain of 64 die per wafer. Therefore, considerable effort is given to keep the edge cleaning area, called the edge exclusion, to a minimum. The ITRS, specifically in the area of edge exclusion, indicates the need to move from current 3-5 mm edge exclusion down to 1 mm or less in the next two years. Conventional wet edge bead cleaning methods are unable to control edge exclusion to this level due to the natural movement of liquids on smooth surfaces, such as a highly polished silicon wafer. It is recognized by those practiced in the art that a non-liquid means of edge cleaning is needed to meet the ITRS guidelines.

Thus there is a need for an improved method and apparatus for cleaning the edges of substrates, such as silicon wafers, which overcomes the aforesaid limitations of the cited prior art. There is also a need for a method and apparatus that does not require the use of solvents, corrosive chemicals, or large volumes of highly purified water. There is also a need for a method and apparatus that prevents process by-products from re-depositing onto usable die. There is a further need for an improved method and apparatus for edge cleaning that can address a wide variety of films, eliminating the need for different systems for each film type. There is also a need for an edge cleaning method and apparatus that can accurately clean all wafer edges (top, top bevel, apex, bottom bevel, and bottom) in a single tool, thereby reducing the cost and complexity of the cleaning process. Finally, there is a further need for an edge cleaning method and apparatus that can precisely control the width of the area being cleaned on the edge of a substrate to 1 mm or less, in order to increase the die yield and meet future semiconductor manufacturing requirements.

SUMMARY

The present disclosure is directed to removal or transformation of unwanted films, particles, and residues on the edges of substrates, such as silicon wafers, by directing laser radiation, in the presence of air or other fluids, to the top edge, top bevel, apex, bottom bevel, and bottom edge (hereinafter 'wafer edges') portions of the substrate. By-products are removed by means of a vacuum exhaust.

One object herein is to provide an edge processing system that does not require the use of solvents, corrosive chemicals, or large volumes of highly purified water, and does not harm the environment. In accordance with a preferred embodiment, the system operates at atmospheric pressure and uses laser radiation in the presence of gases, such as air or benign gas mixtures, to remove materials from wafer edges. This system permits the use of a dry process, eliminating the need for significant volumes of high-purity water, concentrated acids, highly alkaline solutions, proprietary strippers, or solvents.

Another object herein is to prevent process by-products from re-depositing onto usable die. In accordance with a preferred embodiment a laser and optical beam delivery system in conjunction with a vacuum exhaust system removes unwanted films, particles, and residues from wafer edges without re-depositing by-products onto otherwise usable die. A preferred embodiment uses a cylindrical exhaust tube, which envelops the substrate edge, with a longitudinal slot for the substrate and circumferential slots for the laser beam, and a vacuum exhaust source to create airflow to carry by-products and film residues away from the reaction zone, preventing any debris from landing elsewhere on the substrate.

Another object herein is to remove or transform a wide variety of materials on all of the wafer edges in a single tool with a single dry process, eliminating the need for different systems for each material type and thereby reducing the cost and complexity of current processing methods. In accordance with a preferred embodiment, an apparatus and method can effectively remove or transform multiple film types, residues, and particles including, but not limited to, photoresist edge beads, photoresist residues, silicon-based polymer films, post-etch polymer residues, multi-layer film stacks, polishing residues, particles, metal films, and dielectric films. This is achieved by the interaction of the laser radiation with the unwanted films, residues, or particles and surrounding gas on all wafer edges.

Another object is to precisely control the width of the area being processed on the edge of a substrate, in order to increase the number of usable die and meet future semiconductor manufacturing requirements. This is accomplished by the use of a high-accuracy beam delivery system directing a precisely defined laser beam to all of the wafer edges.

Further objects, technologies, and areas of applicability of the method and apparatus will become apparent from the detailed description provided hereinafter. It should be understood that the detailed description and specific examples, while indicating the preferred embodiment of the invention, are intended for the purposes of illustration only and are not intended to limit the scope of the invention, the scope of which is only being defined by the various claims herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention. The organization and manner of the structure and operation of preferred embodiments, together with the above and further objects and advantages thereof, may best be understood by reference to the following description taken in conjunction with the accompanying drawings wherein like reference numerals identify the elements in which:

FIG. 5a defines the top, apex, bottom, and camera beam path length segments.

FIG. 5b defines the thickness of the wafer and the offset from the wafer edge of the top and bottom beams.

DETAILED DESCRIPTION OF THE ILLUSTRATED EMBODIMENTS

Figure 1A:
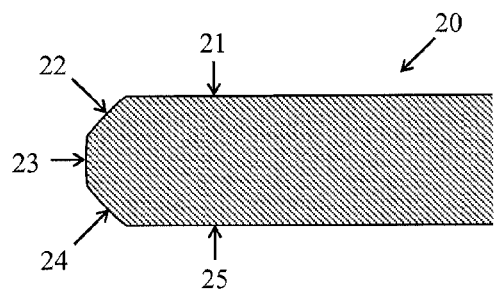
FIG. 1a is a cross-sectional diagram showing a wafer and identifying various surfaces thereof.

A description of example embodiments of the invention follows.

While the invention as recited in the claims presented elsewhere in this document may be susceptible to embodiment in different forms, there is shown in the drawings, and will be described herein in detail, one or more specific embodiments with the understanding that the present disclosure is to be considered but one exemplification of the principles of the invention, and there is no intent to limit the invention to that as illustrated and described herein. Therefore, any references to "the present invention" and "the disclosure" throughout this document are to be interpreted only as a reference to one particular, non-limiting example embodiment of but one aspect of the many inventions described and disclosed in this document.

The disclosure describes an apparatus and methods(s) for removing or transforming unwanted films, residues, and particles from the top, top bevel, apex, bottom bevel, and bottom (hereinafter 'wafer edges') of semiconductor substrates.

Figure 1B:
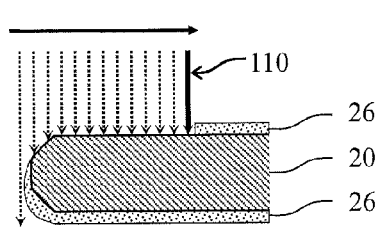
FIG. 1b is a cross-sectional diagram showing a top beam as it scans the top and top bevel of the wafer.
Figure 1E:
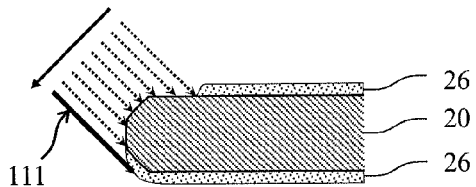
FIG. 1e is a cross-sectional diagram showing a top bevel beam as it scans the top, top bevel and apex of the wafer.
Figure 1C:
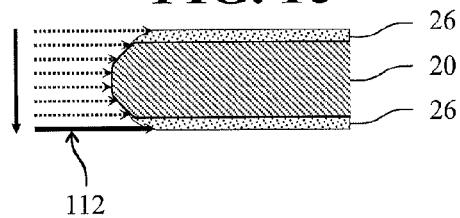
FIG. 1c is a cross-sectional diagram showing an apex beam as it scans the top bevel, apex, and bottom bevel of the wafer.
Figure 1F:
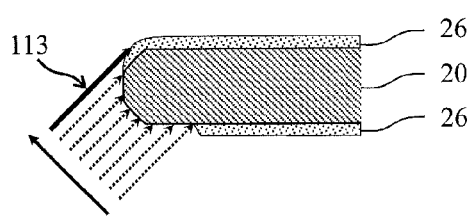
FIG. 1f is a cross-sectional diagram showing a bottom bevel beam as it scans the bottom, bottom bevel and apex of the wafer.
Figure 1D:
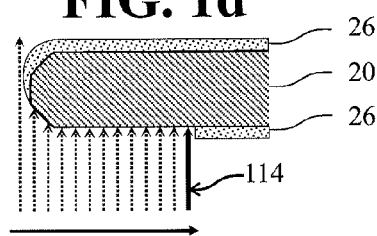
FIG. 1d is a cross-sectional diagram showing a bottom beam as it scans the bottom and bottom bevel of the wafer.
Figure 1G:
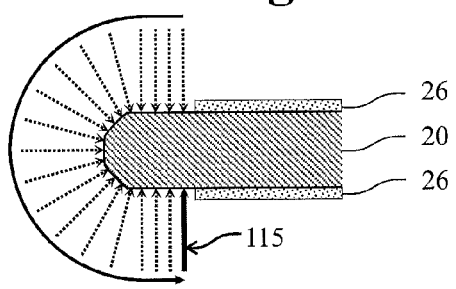
FIG. 1g is a cross-sectional diagram showing a beam as it continuously scans all edges of the wafer.

FIG. 1a identifies the edges of the wafer 20 which are referred to in the description that follows. The surfaces that are scanned are the top 21, top bevel 22, apex 23, bottom bevel 24, and bottom 25. FIG. 1b is an example showing the top beam 110 scanning the top 21 and top bevel 22 of the wafer 20, removing the photoresist 26 from the surfaces that are scanned. FIG. 1c is an example showing the apex beam 112 scanning the top bevel 22, apex 23, and bottom bevel 24 of the wafer 20, removing the photoresist 26 from the surfaces that are scanned. FIG. 1d is an example showing the bottom beam 114 scanning the bottom 25 and bottom bevel 24 of the wafer 20, removing the photoresist 26 from the surfaces that are scanned. FIG. 1e is an example showing the top apex beam 111 scanning the top 21, top bevel 22, and apex 23 of the wafer 20, removing the photoresist 26 from the surfaces that are scanned. FIG. 1f is an example showing the bottom apex beam 113 scanning the bottom 25, bottom bevel 24, and apex 23 of the wafer 20, removing the photoresist 26 from the surfaces that are scanned. FIG. 1g is an example showing the beam 115 continuously scanning all edges of the wafer 20, removing the photoresist 26 from the surfaces that are scanned. The area where the laser beam is processing the wafer is hereinafter referred to as the 'reaction site'.

Figure 2A:
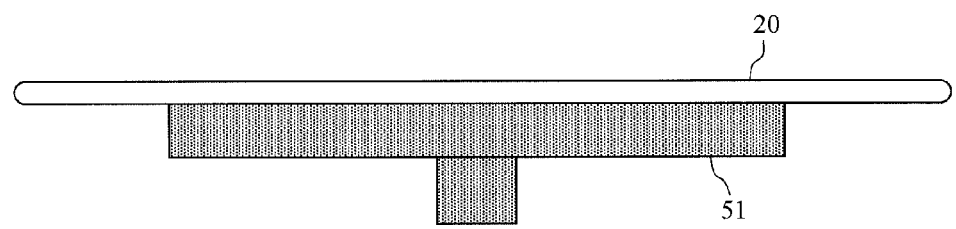
FIG. 2a is a side-elevational view of a semiconductor wafer mounted on a vacuum chuck, prior to being coated with photoresist.
Figure 2B:
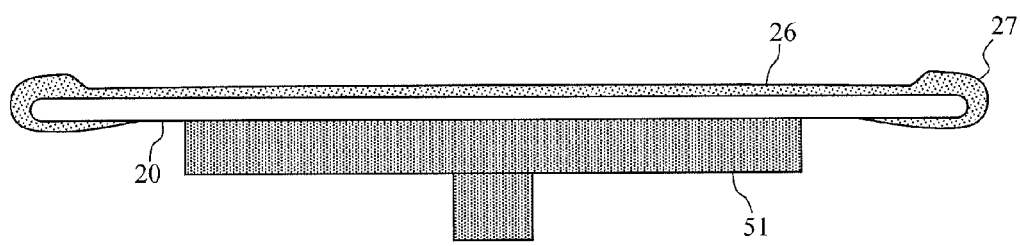
FIG. 2b shows the same wafer as in FIG. 2a, after being coated with photoresist.
Figure 2C:
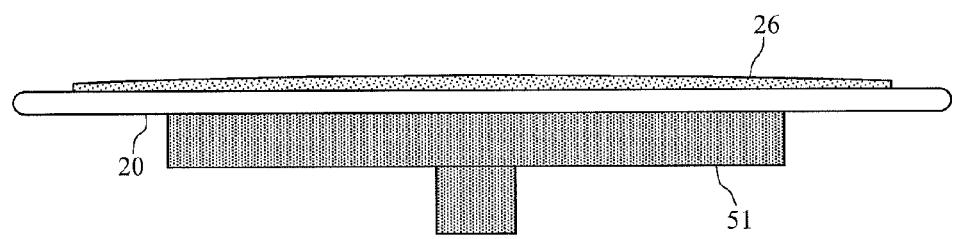
FIG. 2c shows the same wafer as in FIG. 2b after the photoresist edge bead has been removed.

FIGS. 2a, 2b and 2c show how edge bead photoresist problems are created, and solved. FIG. 2a shows an uncoated semiconductor wafer 20 placed on vacuum chuck 51. FIG. 2b shows the same wafer coated with photoresist 26 where the excess photoresist 27 builds up on the edges of wafer 20, illustrating one edge bead problem. If this excess photoresist 27 on the edges of the wafer 20 is not removed, it may crack, shatter and leave particles on other parts of the wafer 20 and on process equipment, causing defects and die loss. FIG. 2c shows wafer 20 after the excess photoresist 27 is removed using the method and apparatus described herein. Other materials, such as photoresist residues, silicon-based polymer films, post-etch polymer residues, multi-layer film stacks, polishing residues, particles, metal films, and dielectric films, if not removed, may also cause defects and die loss. These materials may also be processed using this method.

Figure 3A:
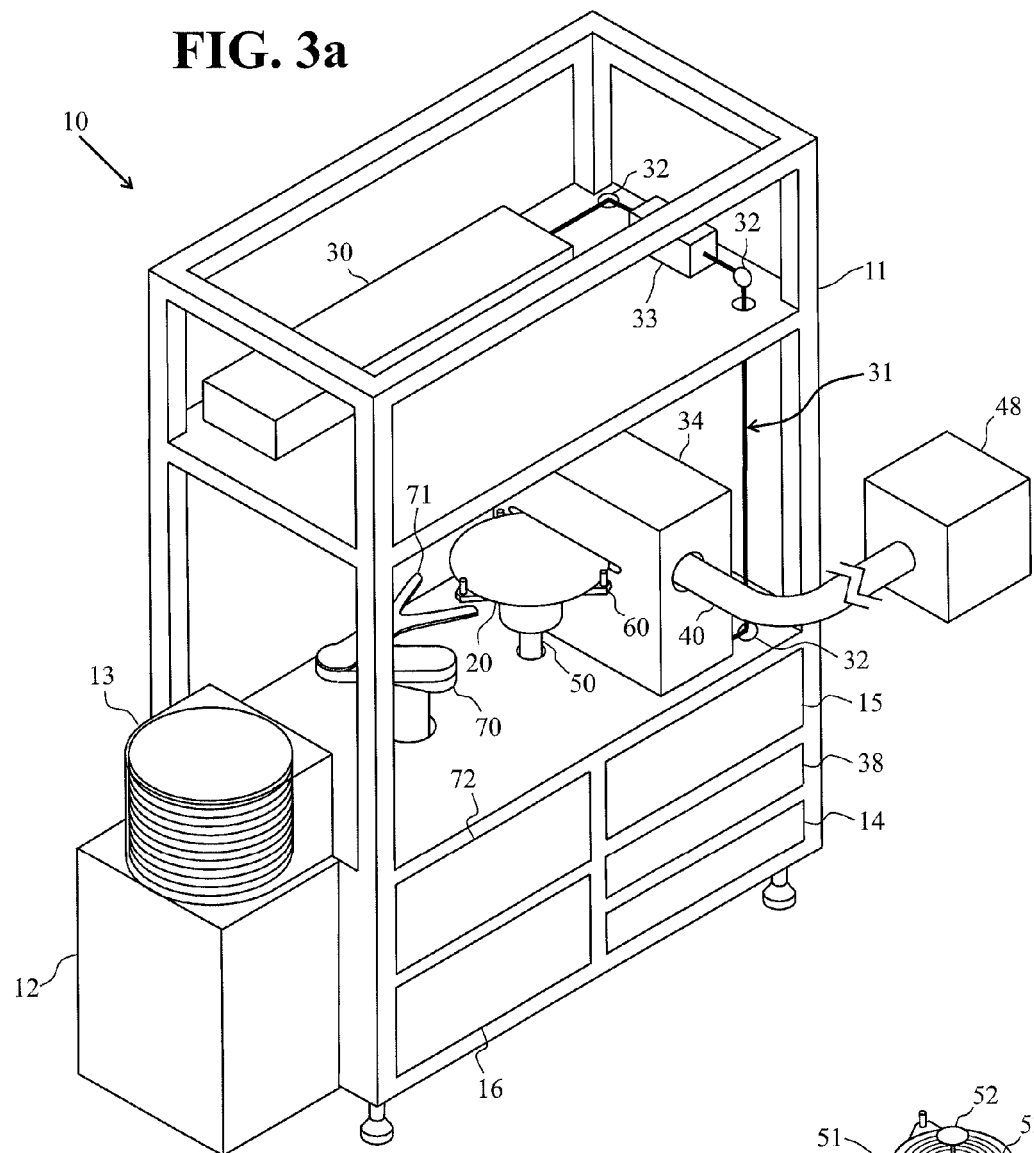
FIG. 3a is an isometric view of an edge processing system according to an embodiment of the invention.

FIG. 3a illustrates a metal frame and enclosure 11 which houses the components used for the water edge processing system 10 that includes a load port module (LPM) 12 which is mounted to the outside of the frame 11. The LPM 12 holds the front opening unified pod (FOUP) 13 and is controlled by the system software, installed in the system computer 14. An electrical panel assembly 16 supplies power to all electrical components in the system and it contains components that are under the control of the system computer 14.

In a typical operation the end effector 71 of the robot 70 removes a wafer 20 from the FOUP 13. The robot 70 can be configured as a single arm or a multiple arm design. Multiple arms could result in increased throughput by having the ability to handle more than one wafer simultaneously. The robot controller 72 is located in the lower section of the frame 11. The end effector 71 can be configured with an automatic centering fixture that locates the wafer in exactly the same location every time it is picked up.

Figure 3B:
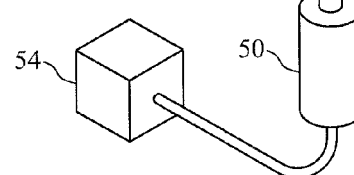
FIG. 3b is an isometric view of the vacuum chuck, lifter and servomotor assembly.

The robot 70 positions the wafer 20 over the vacuum chuck 51, illustrated in FIG. 3b, which also contains a lifter assembly 52, that rises and removes the wafer 20 from the robot end effector 71. The lifter 52 is a platform attached to the top of a rod that comes up through the center of the servomotor assembly 50. This platform makes contact with the center of the backside of the wafer 20 and raises it off of the end effector 71. The robot 70 then moves away from the lifter 52, and the lifter 52 lowers the wafer 20 onto the vacuum chuck 51.

In one embodiment, a centering device 60, located below the vacuum chuck 51, includes three contact rollers that center the wafer 20 on the vacuum chuck 51 by means pneumatics controls located on the pneumatics panel 15. The centering device 60 is shown in more detail in FIGS. 6a and 6b.

The vacuum chuck 51 holds the wafer 20 by means of a vacuum supplied by a vacuum source 54 controlled by pneumatics panel 15. The vacuum is supplied to the vacuum chuck 51 through a hollow shaft in the center of the servomotor assembly 50. The vacuum is distributed across the vacuum chuck 51 via grooves 53 cut into the surface.

An exhaust tube 40, which is connected to an external exhaust source 48, slides into place under the control of the computer 14, covering the portion of the wafer 20 where the reaction takes place. The exhaust tube 40 is mounted on a mechanism, which extends and retracts the exhaust tube 40 away from the wafer to allow the robot 70 to load and unload the wafer 20.

After the wafer 20 is loaded, centered, and secured by the vacuum chuck 51, the servomotor assembly 50 spins the wafer 20 to the proper velocity. The servomotor assembly 50 is controlled by the system computer 14 and has programmable parameters such as ramp speeds, acceleration, deceleration, velocity, and rotation time.

The edge processing system 10 utilizes a laser 30, which emits radiation in the form of a laser beam 31. The laser power supply 38 is located in the lower section of the frame 11 and is controlled by the computer 14. The beam is passed through beam shaping optics 33 to modify the size, shape and focus parameters, and is reflected by beam-steering mirrors 32 into the beam delivery subsystem 34. The beam delivery subsystem 34, which is controlled by the system computer 14, is an optical assembly that directs the laser beam 31 sequentially to any or all of the top, bottom, and apex edges of the wafer 20, in any order. In the preferred embodiment, the beam delivery subsystem 34 uses a galvanometric scan mirror and bending mirrors to scan the beam across one or more or any combination of wafer edges, as shown in FIGS. 1b, 1c, and 1d, to an accuracy of better than 0.1 mm. In another embodiment, the beam shaping optics 33 and the beam-steering mirrors 32 are replaced by a fiber-optic delivery system. In this embodiment, the beam delivery subsystem 34 scans the beam across one or more or any combination of wafer edges, as shown in FIGS. 1b, 1c, 1d, 1e, and 1f, or continuously across all wafer edges as shown in FIG. 1g.

In the preferred embodiment, FIGS. 4a, 4b, 4c, and 4d show the same system, each with a different beam path configuration. In all of these figures a laser beam 31 exits the laser 30, is shaped by beam shaping optics 32, and directed by steering mirrors such as 33 into the beam delivery subsystem 34. When the laser beam 31 enters the beam delivery subsystem assembly 34 through orifice 35 it reflects off a galvanometric scan mirror 120, which is used to steer the beam into a scan lens 130. In a preferred embodiment, the scan lens 130 is a telecentric f-theta lens with the properties wherein the angle of the scan mirror is proportional to the distance moved on the wafer 20, the beam exit angle is normal to the wafer 20, and the beam is focused on the plane of the wafer 20.

Figure 4A:
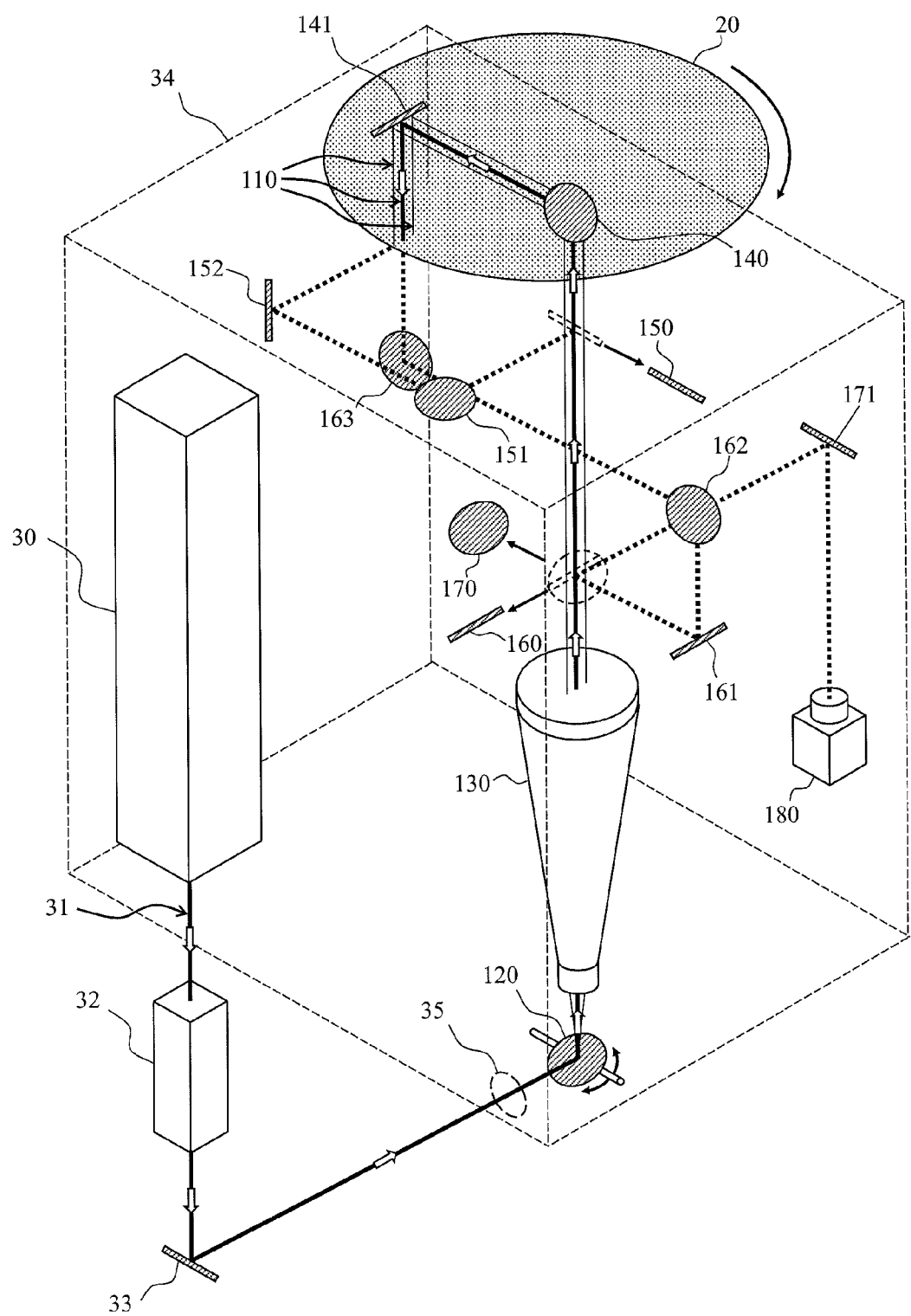
FIG. 4a is an isometric drawing showing the mirror configuration that directs the laser beam to the top surface of the rotating wafer.

In FIG. 4a the mirrors are shown in a configuration that directs the scanning laser beam 110 (represented by a thick center line and two thin lines on either side indicating the scan range) to the top surface of the wafer 20, which is scanned in a radial direction as shown in FIG. 1b. In this configuration, the beam 110 exits the scan lens 130 and is directed to mirror 140, then directed to mirror 141 that directs the beam 110 onto the wafer 20. In the preferred embodiment, mirrors 140 and 141 are configured such that the scan direction is perpendicular to the plane of incidence of said mirrors in order to allow maximum scan range.

Figure 4B:
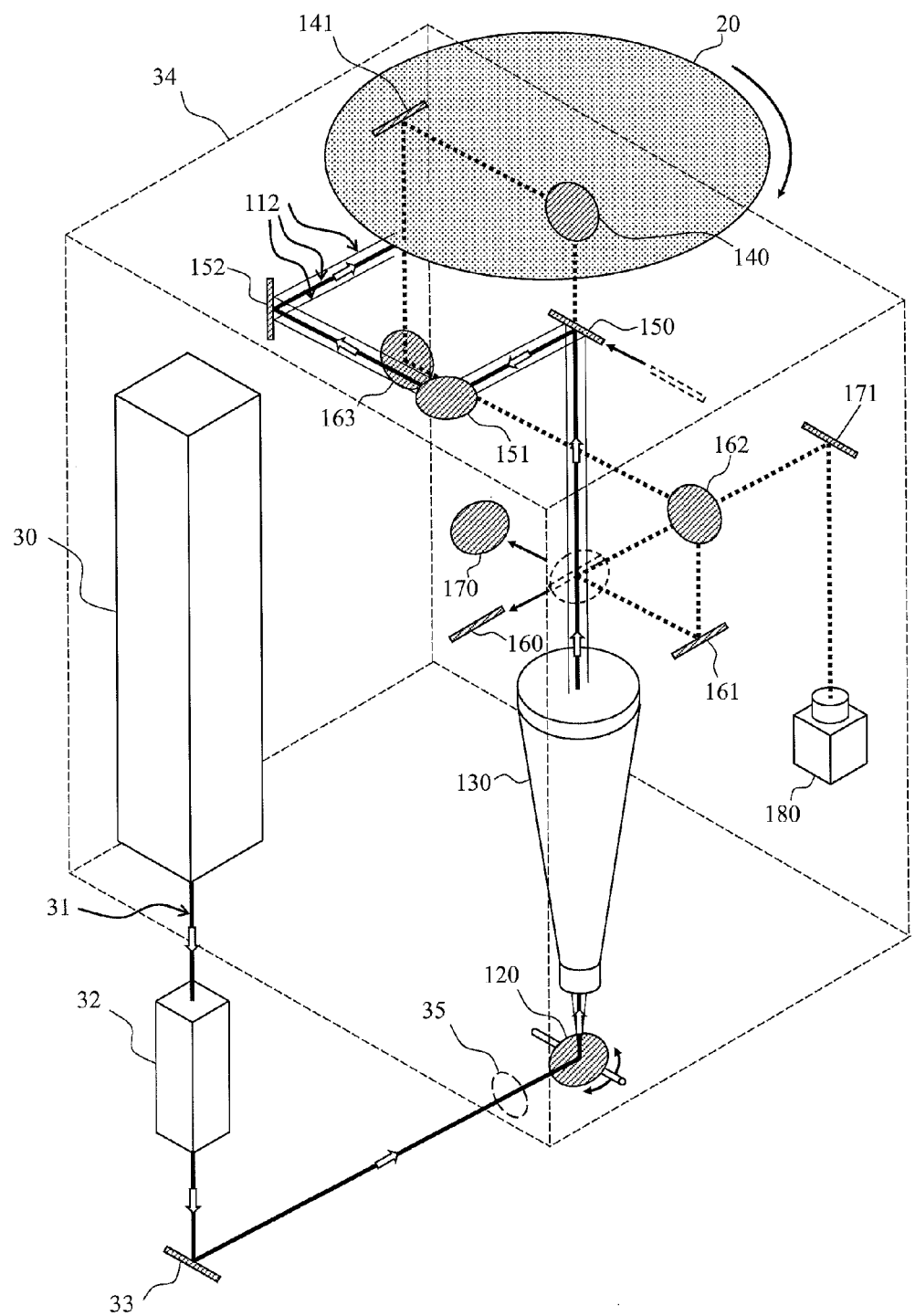
FIG. 4b is an isometric drawing showing the mirror configuration that directs the laser beam to the apex of the rotating wafer.

In FIG. 4b the mirrors are shown in a configuration that directs the scanning laser beam 112 (represented by a thick center line and two thin lines on either side indicating the scan range) to the apex surface of the wafer 20, which is scanned in a axial direction as shown in FIG. 1c. In this configuration, the beam 112 exits the scan lens 130 and is directed to moving mirror 150 that has been moved into the path of beam 112. Beam 112 is deflected to mirror 151, then to mirror 152, and then to the apex of the wafer 20. Mirrors 151 and 152 are positioned such that the beam path length is identical to the path length shown in FIG. 4a, ensuring that beams with identical properties are delivered to the top and apex edges of the wafer 20.

Figure 4C:
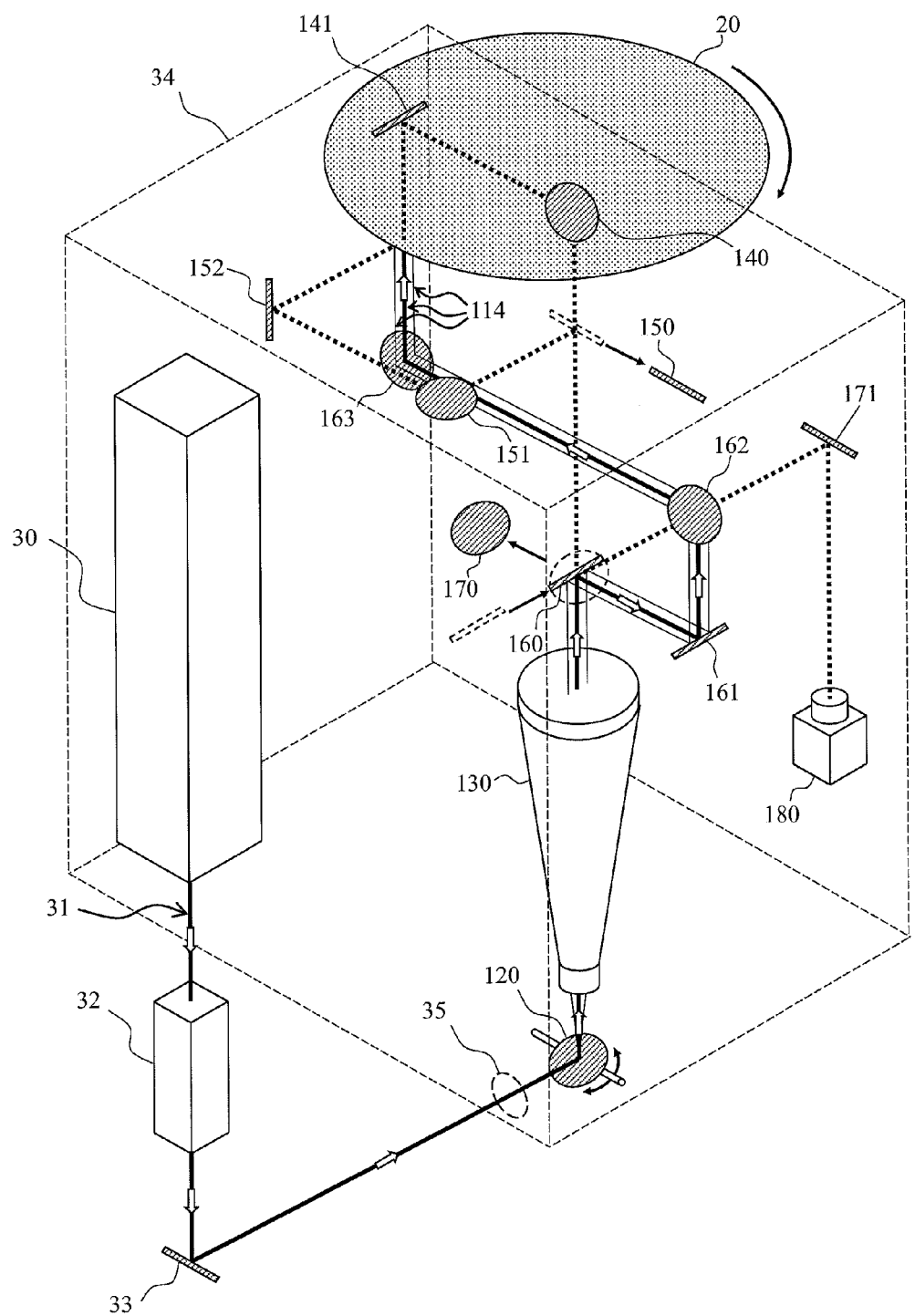
FIG. 4c is an isometric drawing showing the mirror configuration that directs the laser beam to the bottom surface of the rotating wafer.

In FIG. 4c the mirrors are shown in a configuration that directs the scanning laser beam 114 (represented by a thick center line and two thin lines on either side indicating the scan range) to the bottom surface of the wafer 20, which is scanned in a radial direction as shown in FIG. 1d. In this configuration, the beam 114 exits the scan lens 130 and is directed to moving mirror 160 that has been moved into the path of beam 114. Beam 114 is deflected to mirror 161, then to mirror 162, then to mirror 163, and then to the bottom of the wafer 20. Mirrors 161 and 162 are positioned such that the beam path length is identical to the path length shown in FIGS. 4a and 4b, ensuring that beams with identical properties are delivered to the top, apex, and bottom edges of the wafer 20. In the preferred embodiment, mirrors 160, 161, 162, and 163 are configured such that the scan direction is perpendicular to the plane of incidence of said mirrors in order to allow maximum scan range.

Figure 4D:
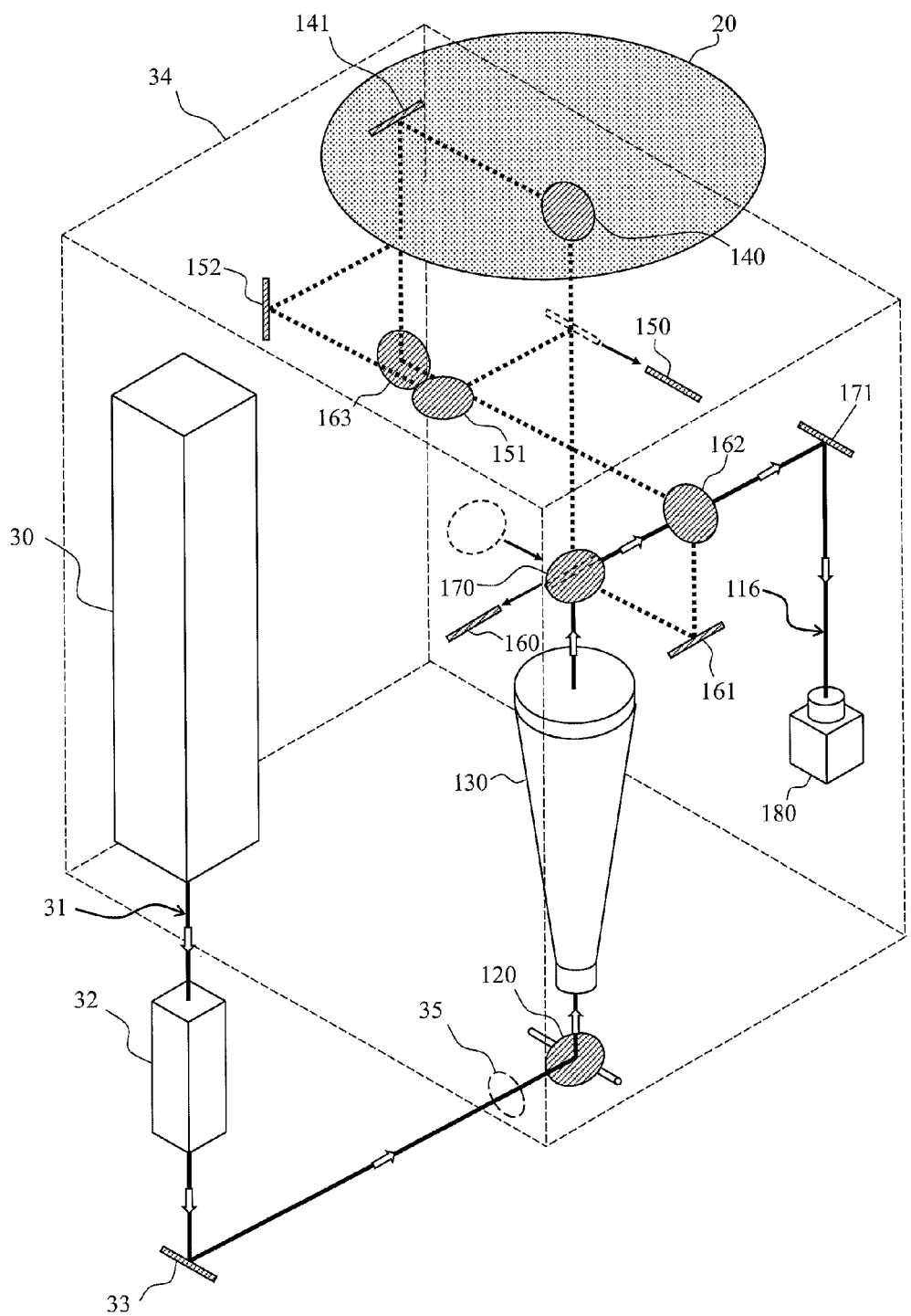
FIG. 4d is an isometric drawing showing the mirror configuration that directs the laser beam to a camera.

In FIG. 4d the mirrors are shown in a configuration that directs the laser beam 116 to the camera 180. In this configuration, the beam 116 exits the scan lens 130 and is directed to moving mirror 170 that has been moved into the path of beam 116. Beam 116 is deflected to mirror 171, then to mirror 172, and then to the camera 180. The camera 180 is positioned such that the beam path length is identical to the path length shown in FIGS. 4a, 4b and 4c, ensuring that the beam delivered to camera 180 has properties identical to the beams delivered to the top, apex, and bottom edges of the wafer 20.

In a preferred embodiment, all moving mirrors 150, 160, and 170 move in a direction parallel to the plane of each mirror. This ensures that a small error in the placement of each moving mirror will not result in a beam placement error on the wafer 20.

FIG. 5a shows the relationships among the path lengths for a preferred embodiment, which are calculated as follows:

The total path length of the optical system from the exit (top) of the scan lens 130 to the wafer 20 is defined as P. This path length must be equal to the working distance of the scan lens 130. Referring to FIG. 5a:

The distance from the exit of scan lens 130 to mirror 140 is defined as $T_1$.

The distance from mirror 140 to mirror 141 is defined as $T_2$.

The distance from mirror 141 to the top of wafer 20 is defined as $T_3$.

The distance from the exit of scan lens 130 to mirror 150 is defined as $A_1$.

The distance from mirror 150 to mirror 151 is defined as $A_2$.

The distance from mirror 151 to mirror 152 is defined as $A_3$.

The distance from mirror 152 to the apex of wafer 20 is defined as $A_4$.

The distance from the exit of scan lens 130 to mirror 160 is defined as $B_1$.

The distance from mirror 160 to mirror 161 is defined as $B_2$.

The distance from mirror 161 to mirror 162 is defined as $B_3$.

The distance from mirror 162 to mirror 163 is defined as $B_4$.

The distance from mirror 163 to the bottom of wafer 20 is defined as $B_5$.

The distance from the exit of scan lens 130 to mirror 170 is defined as $C_1$.

The distance from mirror 170 to mirror 171 is defined as $C_2$.

The distance from mirror 171 to camera 180 is defined as $C_3$.

FIG. 5b shows a cross-section of the wafer 20 and the top laser beam 110, apex laser beam 112, and bottom laser beam 114 as they impinge upon the wafer 20. The thickness of the wafer 20 is defined as W.

In order to process the widest possible annulus on the wafer 20, when the laser beam exits the scan lens 130 on its optical axis, the position of the top laser beam 110 and the bottom laser beam 114 on the wafer 20 should be located slightly less than half of the total possible scan length, which is limited by the diameter of all system mirrors, from the edge of the wafer. Referring to FIG. 5b, this distance is defined as D. In a preferred embodiment, the distance defined as D is identical for the top beam 110 and the bottom beam 114.

With independent variables D, W, P, $T_1$, $T_2$, $B_1$, $B_3$, $C_1$, and $C_2$, the following relationships ensure that the top, apex, bottom, and camera optical paths are all equal to the total optical path length P and that all mirror angles of incidence are 45° when the laser beam exits the scan lens 130 on its optical axis:

$$T_3 = P - T_1 - T_2$$

$$A_1 = -P + 2T_1 + T_2 - W/2$$

$$A_2 = P - T_1 - T_2 + W/4 + D/2$$

$$A_3 = T_2$$

$$A_4 = P - T_1 - T_2 + W/4 - D/2$$

$$B_2 = P - T_1 - T_2 + W/2$$

$$B_4 = P - T_1 + W/2$$

$$B_5 = -P + 2T_1 + T_2 - W - B_1$$

$$C_3 = P - C_1 - C_2$$

Due to machine tolerances and other possible slight errors in the positions of the system mirrors, the beam paths in the system may not be exactly the same length when the system is assembled. Therefore, in the preferred embodiment of the present invention each possible beam path has an adjustment that fine-tunes that path length without affecting beam position on the wafer 20.

Figure 6:
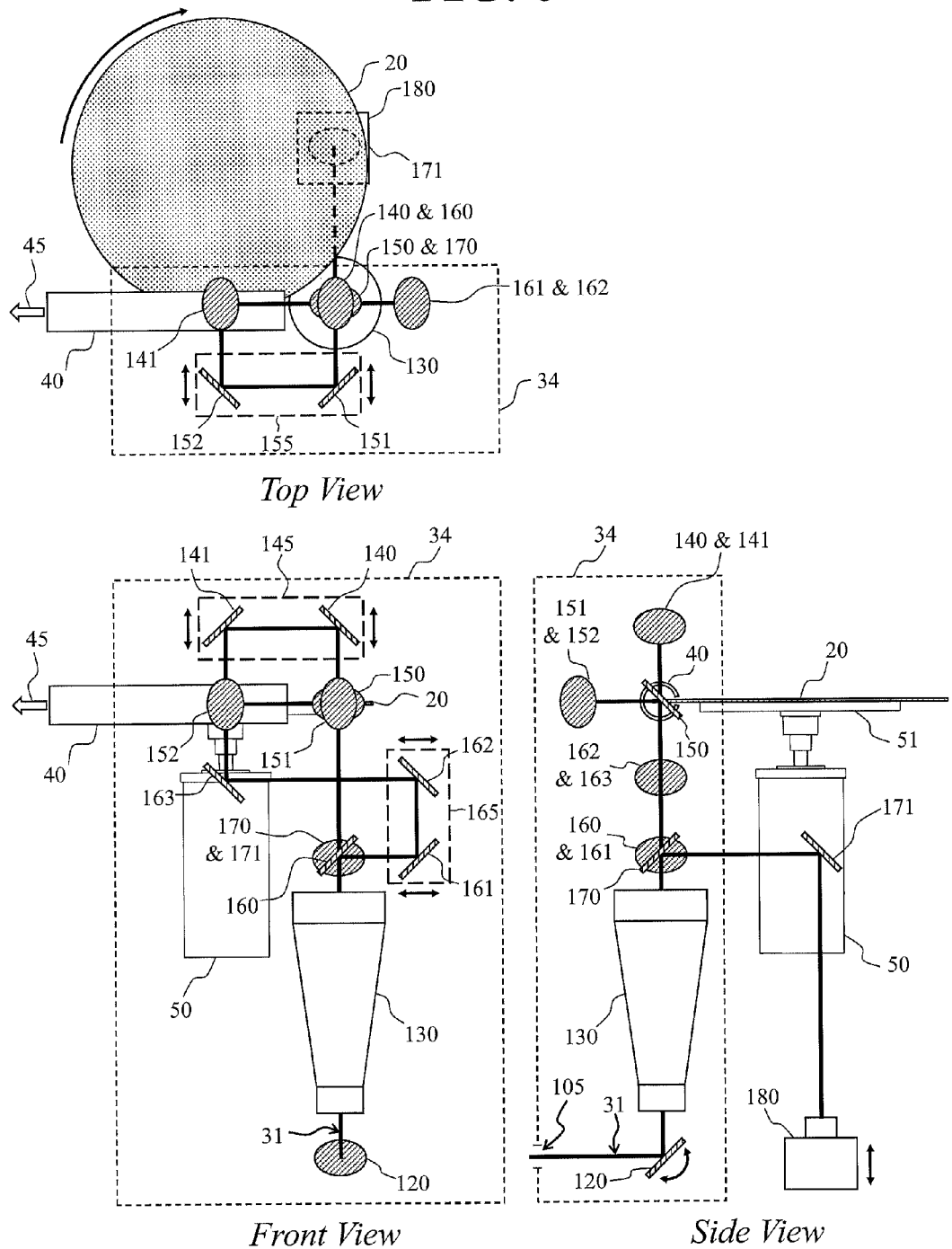
FIG. 6 is a top, front, and side view of the OTB (Orthogonal Tri Beam) assembly with the addition of supporting subsystems. This figure is shown with all movable mirrors in place and the laser beam taking all possible paths. This figure also shows which sets of mirrors move together on stages to fine-tune the length of each beam path.

FIG. 6 shows top, front, and side views of the preferred embodiment of the beam delivery subsystem 34, the wafer 20 mounted on a vacuum chuck 51 that is rotated by servomotor assembly 50, and an exhaust tube 40 used to remove reaction byproducts 45. In the front view, mirrors 140 and 141 are shown on moving stage 145 that adjusts the total length of the top beam path. In the top view, mirrors 151 and 152 are shown on moving stage 155 that adjusts the total length of the apex beam path. In the front view, mirrors 161 and 162 are shown on moving stage 165 that adjusts the total length of the bottom beam path. As each stage with two mirrors is moved, the length of the affected beam path is adjusted by twice the distance that the stage is moved without moving the beam position on wafer 20. In the side view, camera 180 is shown as being vertically adjustable to adjust the path length to the camera 180.

In a preferred embodiment, an exhaust system as shown in FIGS. 7a to 7d carries reaction by-products away from the reaction site at the wafer 20. The servomotor assembly 50 rotates wafer 20 through a slot 41 in the side of exhaust tube 40. An external exhaust source draws ambient gas through the intake end 46 of the exhaust tube 40, thus carrying away reaction by-products 45. The beam reaches the wafer through the exhaust tube by means of slots 42 and 44 and hole 43. If the slots 42 and 44 were opposite each other on the exhaust tube 40, then as the beam was scanned off the edge of the wafer 20, the beam would exit the exhaust tube 40 through the opposite slot, causing damage inside the beam delivery subsystem 34. In a preferred embodiment the slots 42 and 44 are offset from each other so that the beam is blocked by the opposite side of the exhaust tube 40, which is lined with a material, such as textured synthetic fused silica, which is impervious to the laser beam.

Figure 7A:
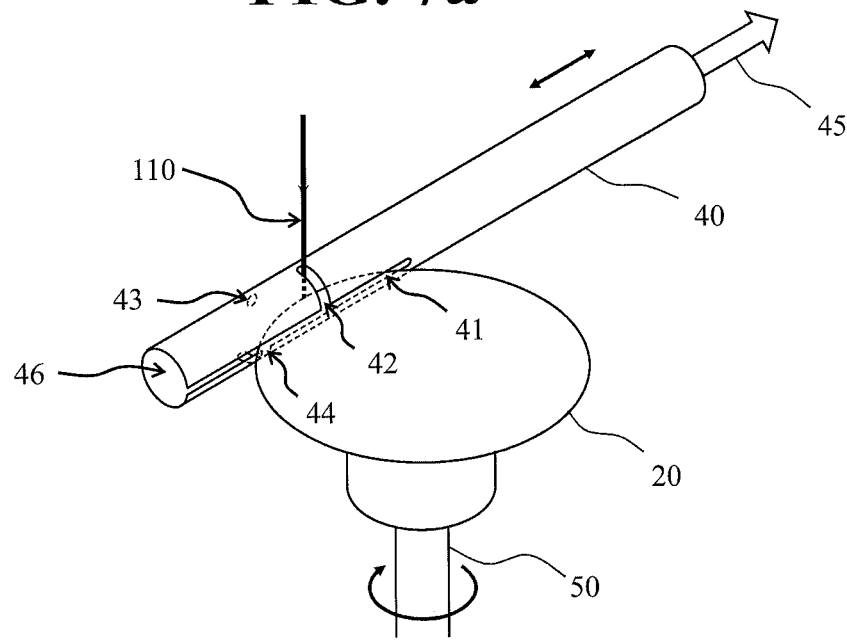
FIG. 7a is an isometric view of the wafer and exhaust system showing the beam directed to the top of the rotating wafer.
Figure 7B:
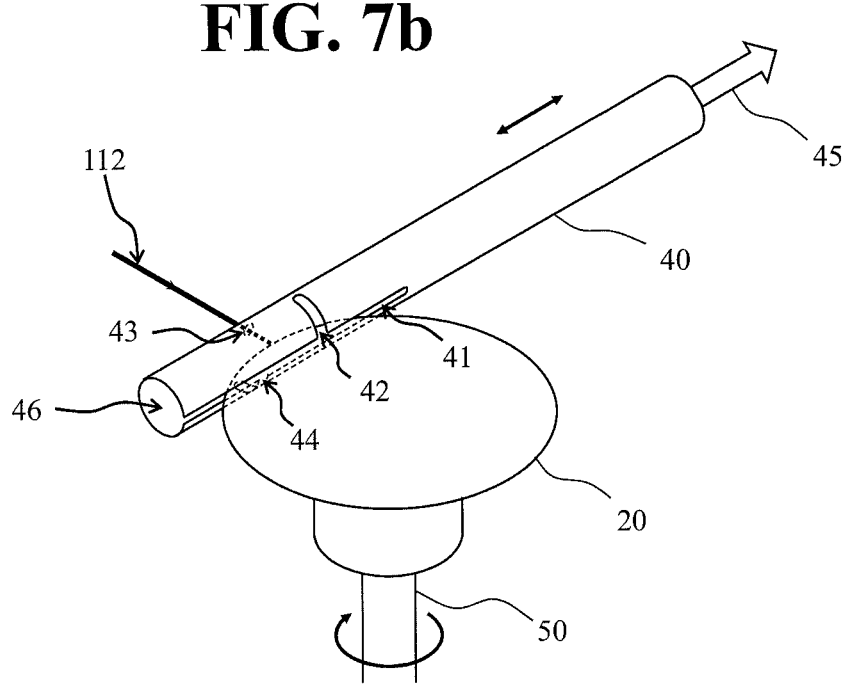
FIG. 7b is an isometric view of the wafer and exhaust system showing the beam directed to the apex of the rotating wafer.
Figure 7C:
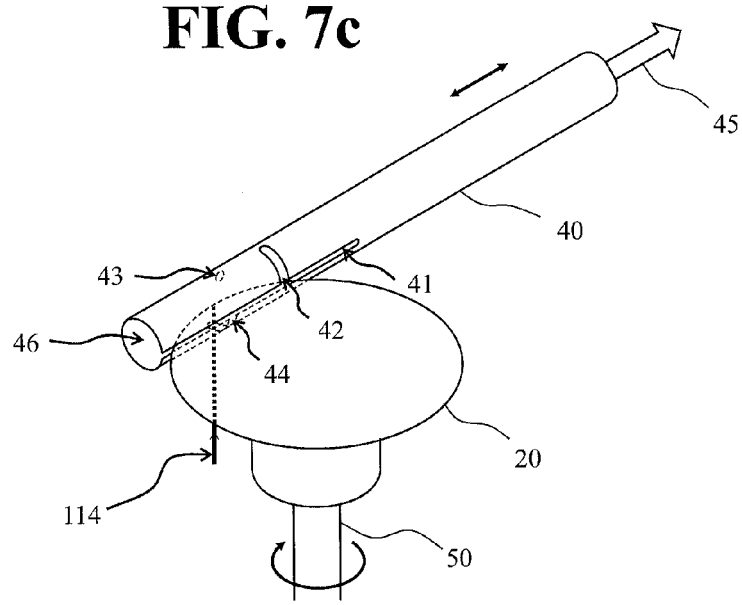
FIG. 7c is an isometric view of the wafer and exhaust system showing the beam directed to the bottom of the rotating wafer.
Figure 7D:
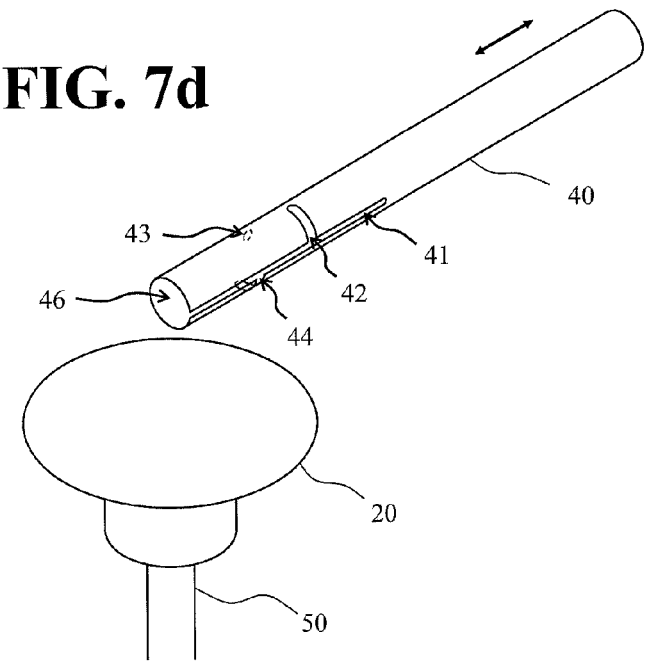
FIG. 7d is an isometric view of the wafer and exhaust system showing the exhaust tube retracted for wafer loading or unloading.

In FIG. 7a the exhaust tube 40 moves into position so that slot 42 is aligned with the top laser beam 110, which is directed through the slot 42 to the top of wafer 20. In FIG. 7b the exhaust tube 40 moves into position so that hole 43 is aligned with the apex laser beam 112, which is directed through the hole 43 to the apex of wafer 20. In FIG. 7c the exhaust tube 40 moves into position so that slot 44 is aligned with the bottom laser beam 114, which is directed through the slot 44 to the bottom of wafer 20. In FIG. 7d the exhaust tube 40 is moved away from the wafer 20 so that robot 70, shown in FIG. 3a, can load or unload the wafer to or from the vacuum chuck 51, shown in FIG. 3b.

Figure 7E:
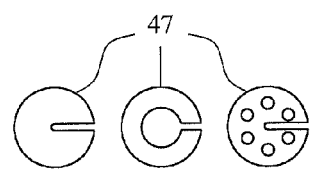
FIG. 7e is a front view showing examples of exhaust baffles.

FIG. 7e shows optional baffle plates 47, any one of which may be affixed to the intake end 46 of the exhaust tube 40 to control the direction and volume of gas flow. The ability to increase or decrease the direction and volume of gas may be desirable in certain applications. The more the flow is blocked with a baffle 47, the more the flow direction is changed from tangential to radial with respect to the wafer 20. In a preferred embodiment, the exhaust flow rate without a baffle is 120 liters per second with a velocity of 60 meters per second.

Figure 8:
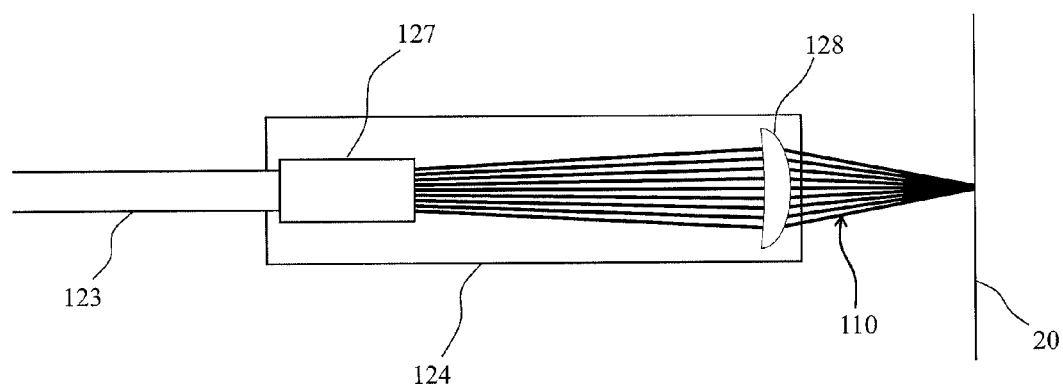
FIG. 8 is a schematic drawing of a fiber-optic head that focuses the beam onto a wafer.

Another approach to directing a laser beam to two or more edges of a wafer employs a fiber-optic beam delivery system. FIG. 8 shows a fiber-optic head 124 that focuses a laser beam 110 from an incoming fiber 123 onto the edge of wafer 20. It includes an output coupler 127 at the end of the fiber 123 and a focusing lens 128, which contains one or more elements, mounted between the output coupler 127 and the edge of wafer 20.

Figure 9:
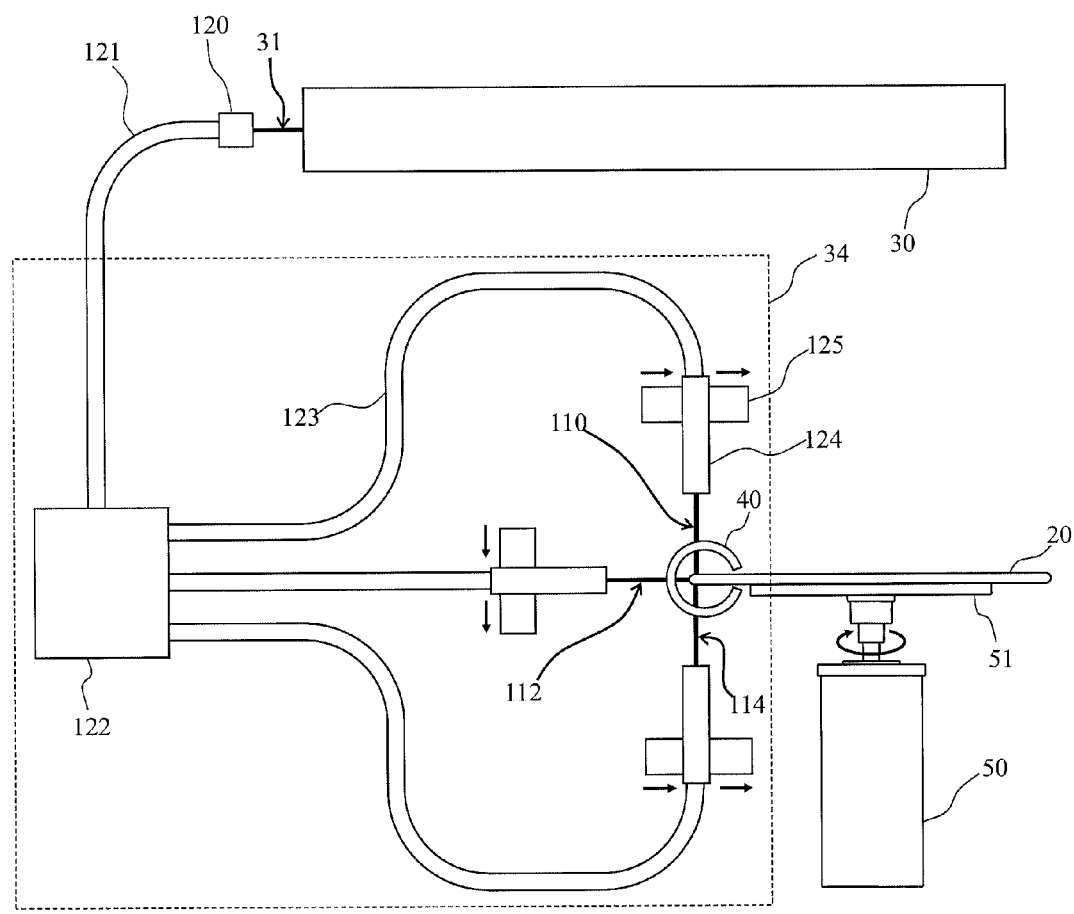
FIG. 9 is a side-view schematic drawing showing three mechanisms that move three fiber-optic heads to deliver laser beams across the top, apex, and bottom of a rotating wafer.

The embodiment shown in FIG. 9 utilizes a laser source 30 that emits a beam 31, which enters input coupler 120 of a fiber-optic cable 121. The fiber-optic cable 121 enters a fiber-optic beam delivery subsystem 34. The fiber-optic beam delivery subsystem 34 contains a distribution module 122. In one embodiment the distribution module 122 splits the beam 31 into three separate beams, which pass through three fiber-optic cables 123 and three fiber-optic heads 124, mounted to three positioning devices 125. In another embodiment the distribution module 122 switches the beam between three separate fiber-optic cables 123 and fiber-optic heads 124, mounted to three positioning devices 125. The positioning devices 125 accurately locate the fiber-optic heads 124, scanning the beams 110, 112, and 114 across all edges of wafer 20. The wafer 20 is placed on a chuck 51, rotated by a servomotor assembly 50. Reaction by-products are removed by means of an exhaust tube 40.

Figure 10:
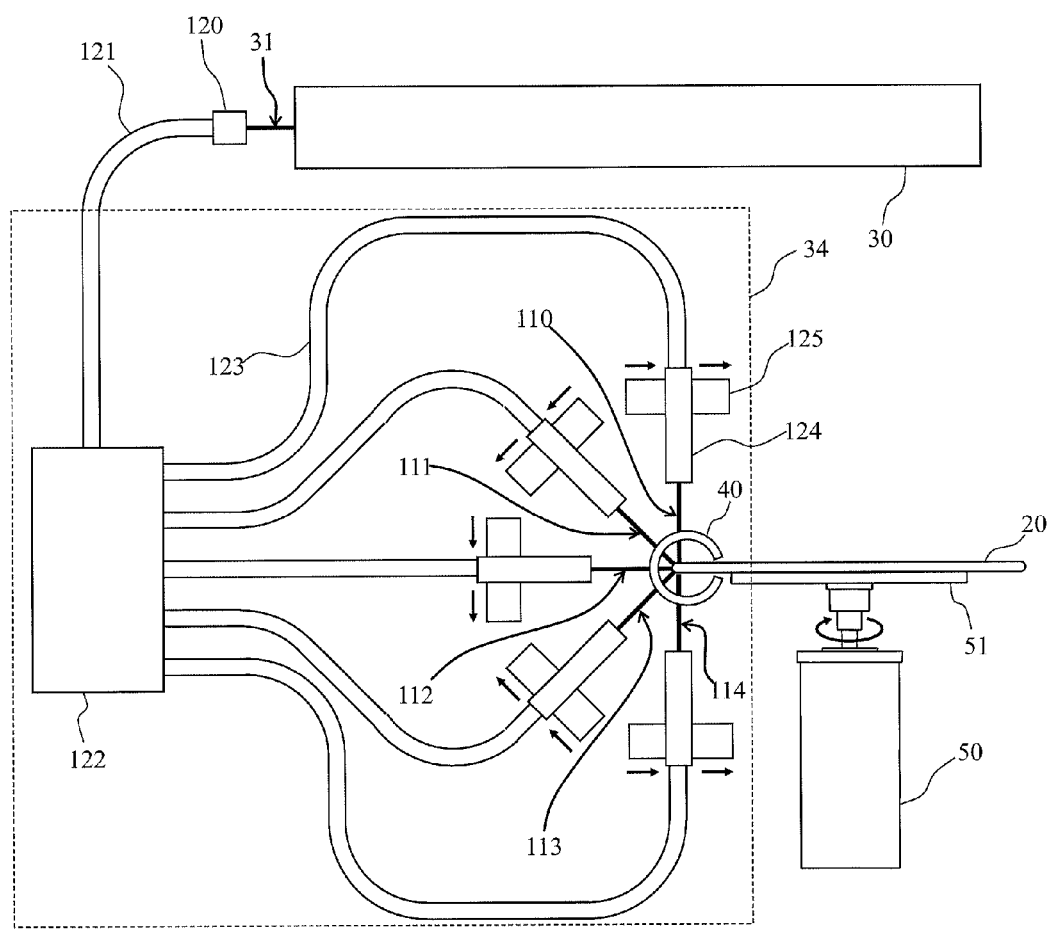
FIG. 10 is a side-view schematic drawing showing five mechanisms that move five fiber-optic heads to deliver laser beams across the top, top bevel, apex, bottom bevel, and bottom of a rotating wafer.

The embodiment shown in FIG. 10 utilizes a laser source 30 that emits a beam 31, which enters input coupler 120 of a fiber-optic cable 121. The fiber-optic cable 121 enters a fiber-optic beam delivery subsystem 34. The fiber-optic beam delivery subsystem 34 contains a distribution module 122. In one embodiment the distribution module 122 splits the beam 31 into five separate beams, which pass through five fiber-optic cables 123 and five fiber-optic heads 124, mounted to five positioning devices 125. In another embodiment the distribution module 122 switches the beam between five separate fiber-optic cables 123 and five fiber-optic heads 124, mounted to five positioning devices 125. The positioning devices 125 accurately locate the fiber-optic heads 124, scanning the beams 110, 111, 112, 113, and 114 across all edges of wafer 20. The wafer 20 is placed on a chuck 51, rotated by a servomotor assembly 50. Reaction by-products are removed by means of an exhaust tube 40.

Figure 11:
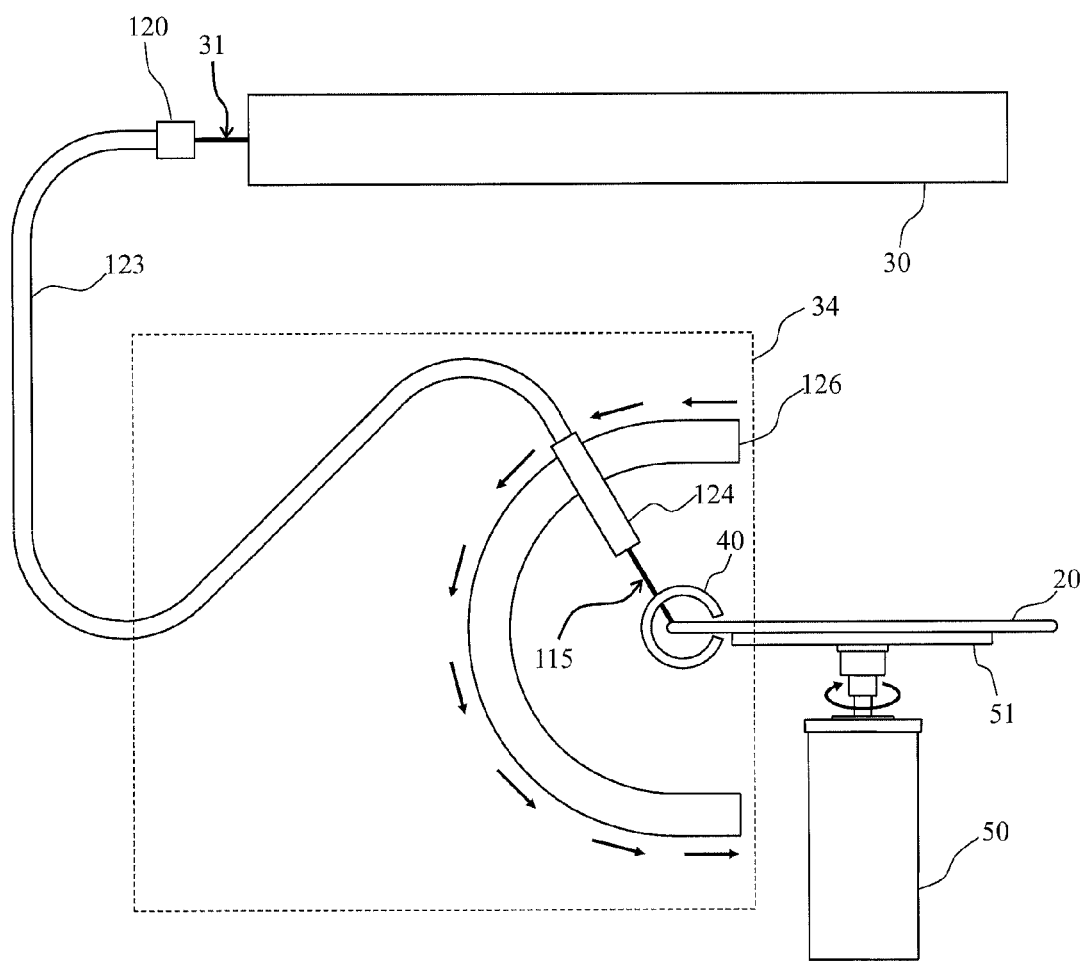
FIG. 11 is a side-view schematic showing a single fiber-optic head mounted on a track to deliver a laser beam to all edges of a rotating wafer.

The embodiment shown in FIG. 11 utilizes a laser source 30 that emits a beam 31, which enters input coupler 120 of a fiber-optic cable 123. The fiber-optic cable 123 enters a beam delivery subsystem 34 where it attaches to a fiber-optic head 124. The fiber-optic head 124 slides along a track 126. In order to provide the same beam profile at all points around the edge of wafer 20, the track 126 is shaped in such a way as to position the fiber-optic head 124 exactly the same distance from, and orthogonal to the edge of wafer 20 as it travels around track 126, scanning beam 115 around the edge of wafer 20. The wafer 20 is placed on a chuck 51 and is rotated by a servomotor assembly 50. Reaction by-products are removed by means of an exhaust tube 40.

Figure 12A:
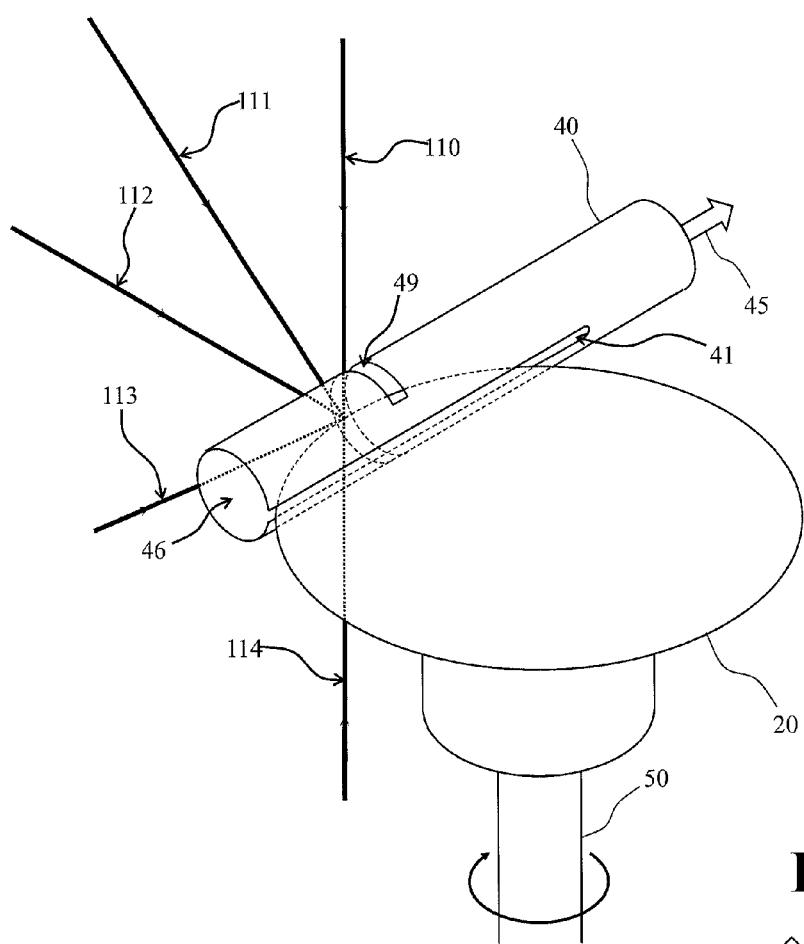
FIG. 12a is an isometric view schematic drawing showing an exhaust tube used with the configurations shown in FIGS. 9, 10, and 11.
Figure 12B:
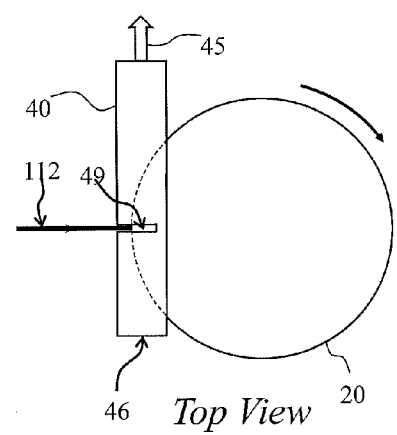
FIG. 12b is a top view schematic drawing showing an exhaust tube used with the configurations shown in FIGS. 9, 10, and 11.

An exhaust system shown in FIGS. 12a and 12b carries reaction by-products 45 away from the reaction site at the wafer 20. The servomotor assembly 50 rotates wafer 20 through a slot 41 in the side of exhaust tube 40. Laser beams 110, 111, 112, 113, and 114 are directed through slot 49 to all edges of wafer 20. An external exhaust source, draws ambient gas through the intake end 46 of the exhaust tube 40, thus carrying away reaction by-products 45. In another embodiment, reversing the rotation to oppose the direction of the exhaust flow may increase the relative flow velocity at the wafer surface thereby improving the performance of the exhaust system.

Figure 12C:
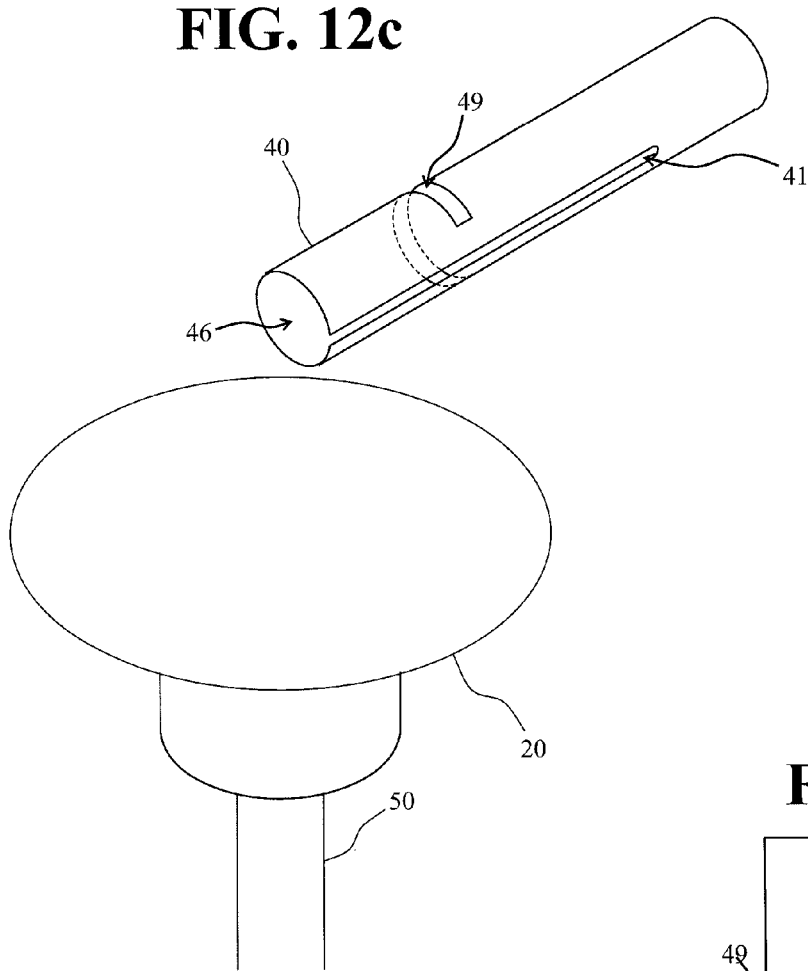
FIG. 12c is an isometric view showing the exhaust system configuration with the exhaust tube retracted for wafer loading.
Figure 12D:
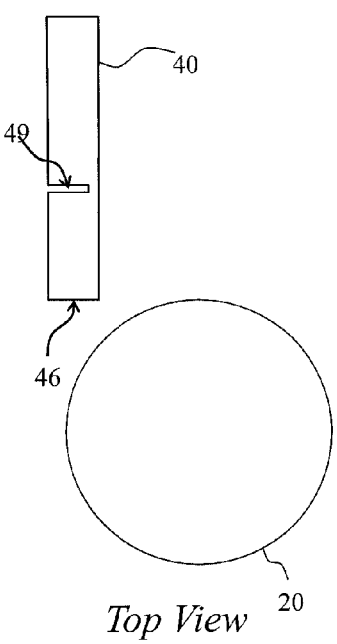
FIG. 12d is a top view showing the exhaust system configuration with the exhaust tube retracted for wafer loading or unloading.

FIGS. 12c and 12d show the same exhaust system as shown in FIGS. 12a and 12b, with the exhaust tube 40 in a retracted position to allow a robot to load or unload the wafer 20.

Figure 13A:
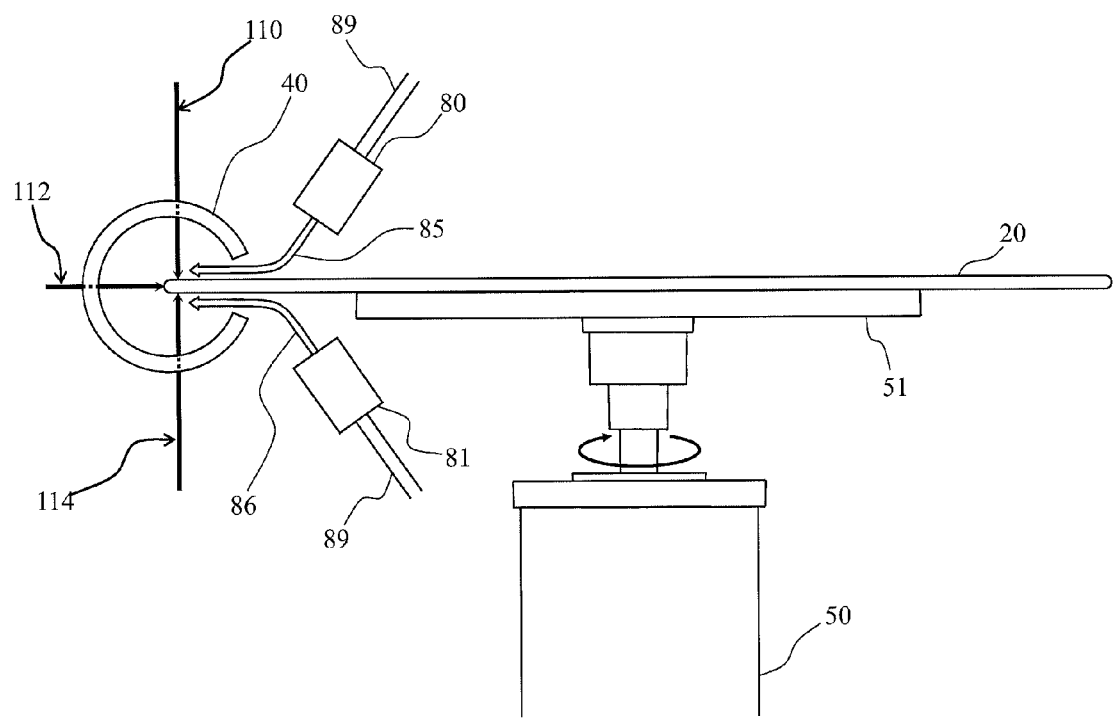
FIG. 13a is a side view of an optional gas injection system of the edge processing system.
Figure 13B:
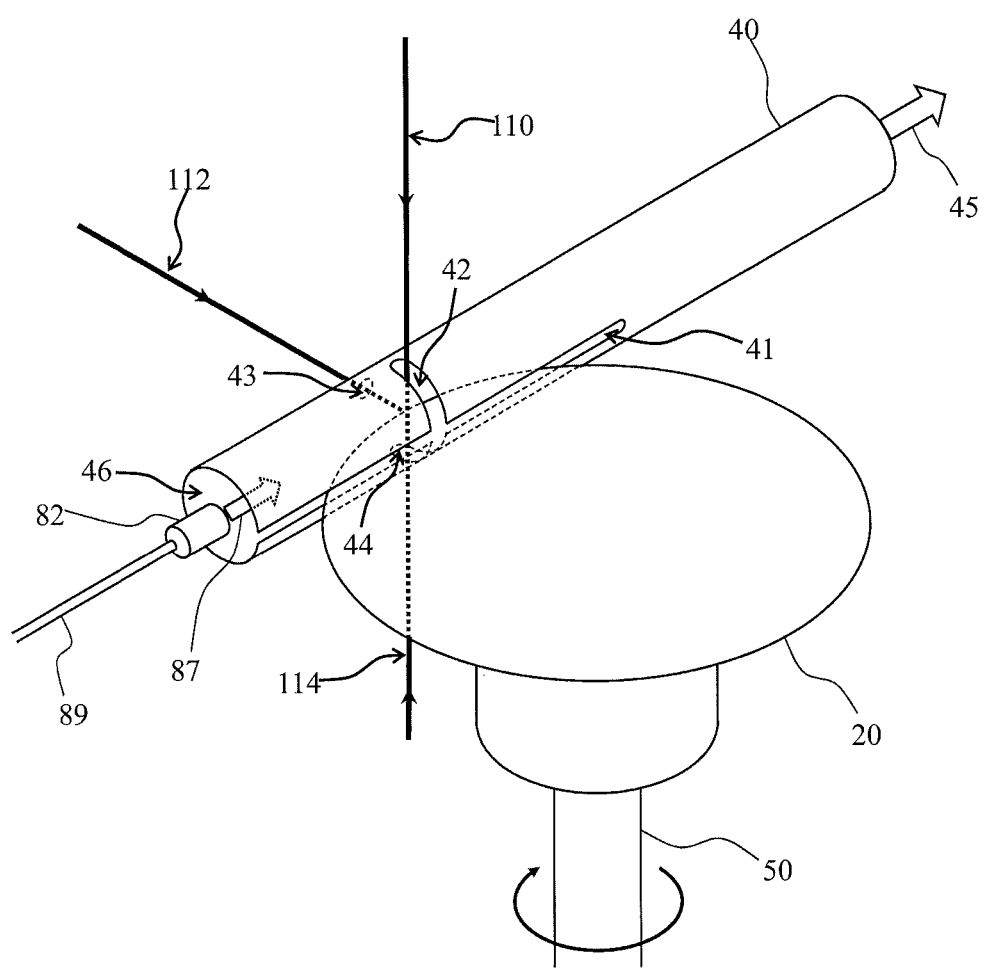
FIG. 13b is an isometric view of a second configuration of an optional gas injection system of the edge processing system.
Figure 13C:
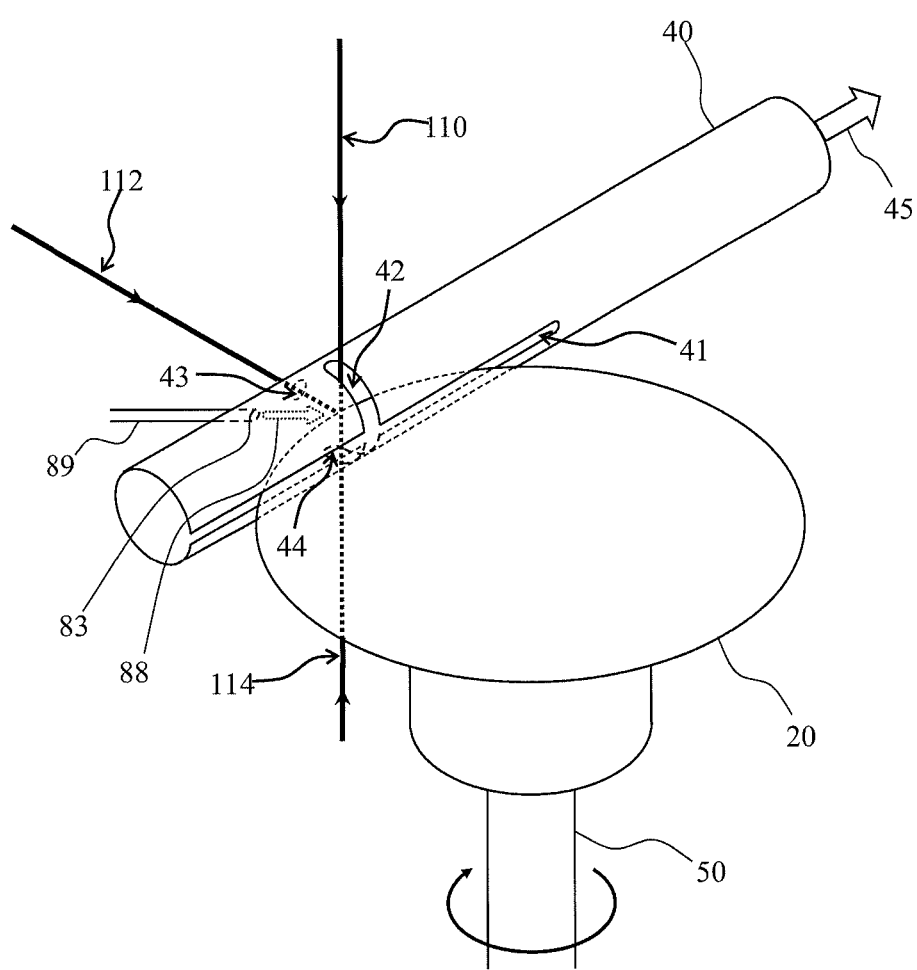
FIG. 13c is an isometric view of a third configuration of an optional gas injection system of the edge processing system.

The optional gas injection systems shown in FIGS. 13a, 13b, and 13c may enhance the reaction between the laser beam and the material being processed. Gases are fed from an external source into the system. Such injected gas may be beneficial in processing the unwanted films, residues, or particles. In a preferred embodiment, the injected gas is an oxidizing gas. Reducing gases such as hydrogen are also effective in removing photoresist. In another embodiment, the injection of hydrogen may also be used to prevent the formation of an oxide layer. The gas injection system may also enhance the removal of unwanted by-products.

In one embodiment, shown in FIG. 13a, the gas streams 85 and/or 86 are produced by a top injector 80 and/or a bottom injector 81 that are fed by gas lines 89. To optimize the reaction, the angle of the injectors 80 and/or 81 can be adjusted with respect to the surface of wafer 20, which is mounted on vacuum chuck 51 and is rotated by servomotor assembly 50. The laser beams 110, 112, and 114 process the edges of wafer 20 while gas streams 85 and/or 86 are flowing.

In another embodiment of an optional gas injection system, shown in FIG. 13b, the gas stream 87 is produced by an axial injector 82 that is fed by a gas line 89 into the intake end 46 of the exhaust. This configuration adds gas to the environment surrounding the reaction site. The laser beams 110, 112, and 114 process the edges of wafer 20 while gas stream 87 is flowing.

In a third embodiment, shown in FIG. 13c, the gas stream 88 is produced by an injector 83, attached to an orifice in the side of the exhaust, and fed by gas line 89 such that the gas flow is aimed at the reaction site on the wafer 20. The laser beams 110, 112, and 114 process the edges of wafer 20 while gas stream 88 is flowing.

Other configurations combining the above injection methods and/or exhaust baffles may be used to enhance the reaction.

Figure 14A:
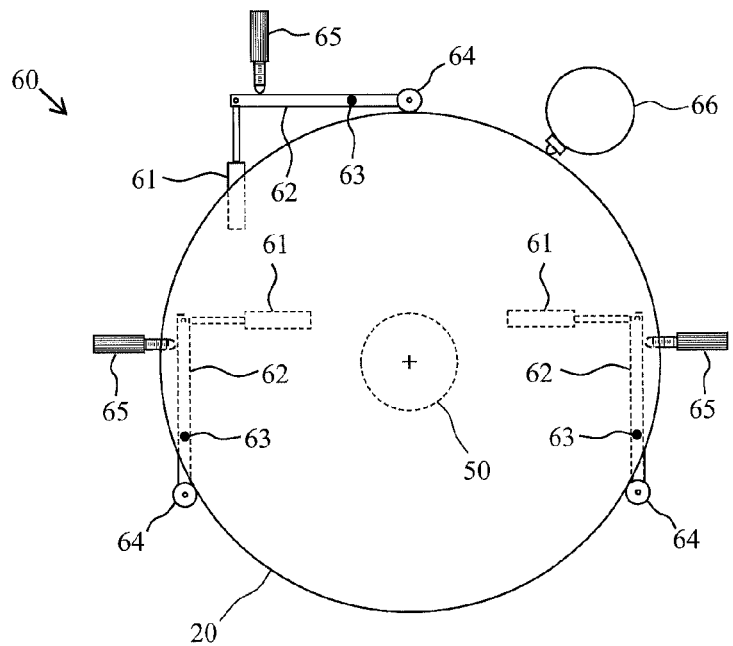
FIG. 14a is a top view of a wafer centering assembly shown in the closed position.
Figure 14B:
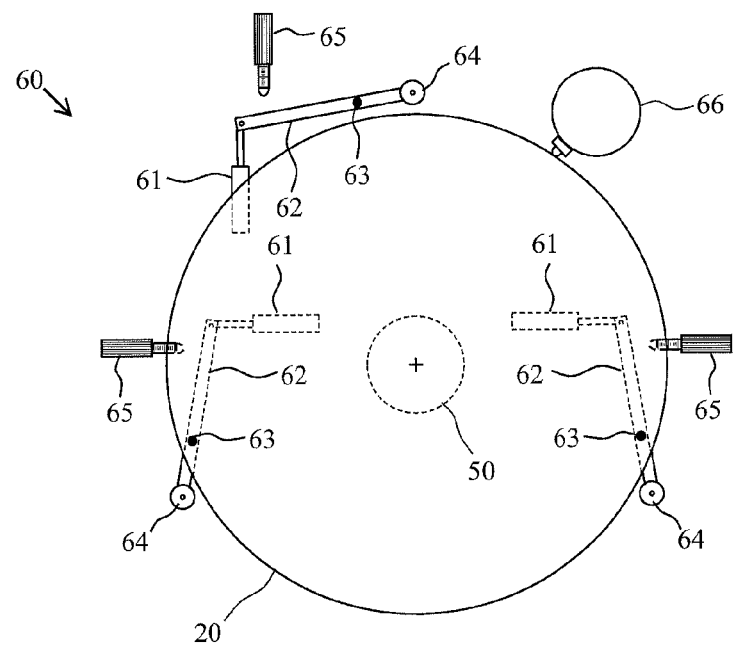
FIG. 14b is a top view of a wafer centering assembly shown in the open position.

The preferred embodiment utilizes a wafer centering assembly 60 shown in FIGS. 14*a* and 14*b*. The wafer centering assembly 60 consists of three contact rollers 64 which make contact with the edges of the wafer 20 at three equally spaced points. In one example of this embodiment, each of the three contact rollers 64 are attached to arms 62 that rotate on a pivot point 63, and are connected to pneumatic cylinders 61 which extend and retract, moving the contact rollers 64 toward and away from the edge of the wafer 20. When all three pneumatic cylinders 61 are extended and all three contact rollers 64 touch the wafer, the contact rollers 64 will center the wafer 20 precisely over the rotational axis of the servomotor assembly 50. In order to load, unload, or process the wafer 20, the pneumatic cylinders 61 are used to retract the contact rollers 64 from the edge of the wafer 20 allowing it to be raised, lowered, or rotated.

To calibrate the wafer centering assembly 60, a dial indicator 66 or other measurement device is placed at the edge of the wafer 20. If the wafer 20 is not centered, the needle of the dial indicator 66 will move as the wafer 20 is rotated. One, two or all three of the micrometers 65 are adjusted until the needle of the dial indicator 66 remains does not move as the wafer 20 is rotated, indicating that the wafer 20 is centered.

In another embodiment the wafer is centered only to an accuracy sufficient to avoid gross wobble, for example, +/−0.5 mm. This may be accomplished using the robot instead of a centering apparatus. After the wafer is loaded, an image of the wafer edge is profiled, for example by capturing it with a digital image recorder. This image then serves as a map used to construct a correction profile for the dependence of edge position on wafer rotation angle. During laser edge processing this correction profile is fed to the system computer to recalculate the beam position to keep the beam a constant distance from the wafer edge as the wafer rotates. This method also enables the scanning beam to follow the shape of a wafer notch or flat as it rotates. This method reduces the complexity of the machine by eliminating the mechanical alignment apparatus. It may also increase accuracy and throughput.

Figure 15:
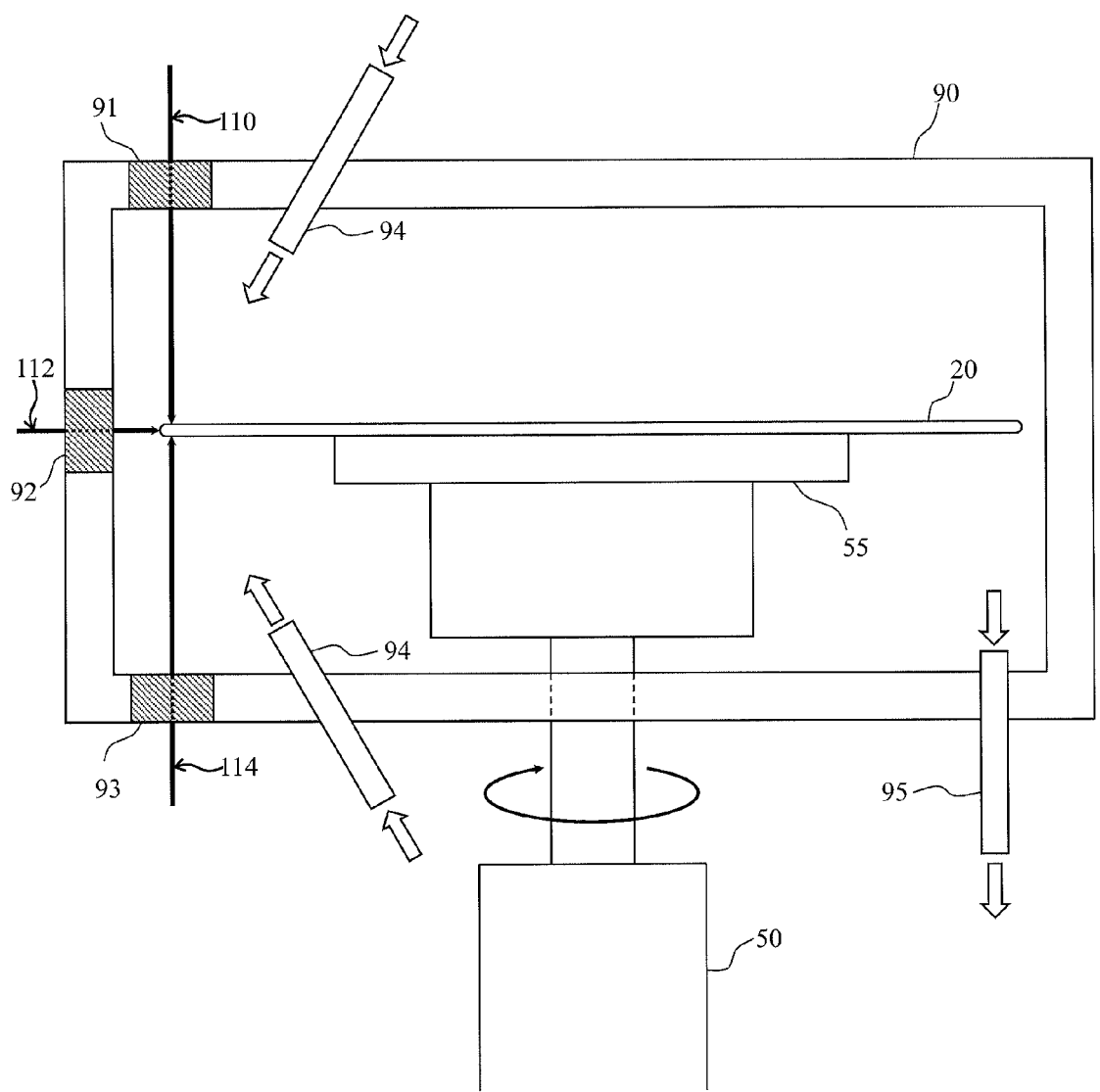
FIG. 15 is a cross-sectional diagram of another embodiment in which the wafer being processed is inside an enclosure.

In another embodiment, the wafer being processed is inside an enclosure, as shown in FIG. 15. In this embodiment a chamber 90 encloses the wafer 20 and the chuck 55, which are rotated with servomotor assembly 50. The top beam 110 reaches the wafer 20 through a window 91. Similarly, the apex beam 112 reaches the wafer 20 through a window 92, and the bottom beam 114 reaches the wafer 20 through a window 93. The chamber 90 may be under vacuum, at atmospheric pressure, or under positive pressure. If the chamber is under vacuum, than the chuck 55 should be an electrostatic chuck, otherwise it may be a vacuum chuck. Gas is fed into the through one or more gas injectors 94 and evacuated through one or more exhaust ports 95. This configuration can facilitate the containment and removal of reaction by-product. Additionally, this configuration permits the use of reactive gasses in order to more efficiently remove photoresist, organic residues, silicon-based resists, inorganic residues, and metal films.

The preferred embodiment is an all-dry process with no waste-treatable by-products. Edge processing or edge film removal from the top bevel, apex, bottom bevel, and bottom edges of the wafer can also be accomplished during the same process cycle. This method and apparatus is capable of processing 0 to 25 mm from the bottom edge, to an accuracy of +/−0.1 mm, in order to remove the photoresist that has migrated to the bottom side of the wafer. Likewise, the method and apparatus is capable of processing 0 to 25 mm from the top edge, to an accuracy of +/−0.1 mm. Cleaning the apex is also important since this edge of the wafer contacts the sides of wafer cassettes and robotic handlers used during transport in a manufacturing line. Any breaks or cracks in an un-removed edge bead can then create particles that may get transferred to other cassettes and other wafers, causing defects and loss of useable die.

Figure 16A:
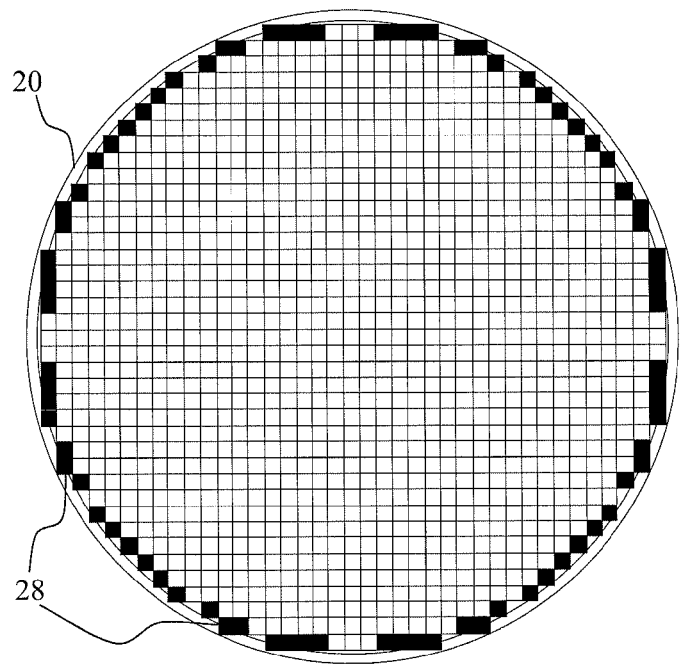
FIG. 16a shows an example of the usable die lost with prior art edge exclusion.
Figure 16B:
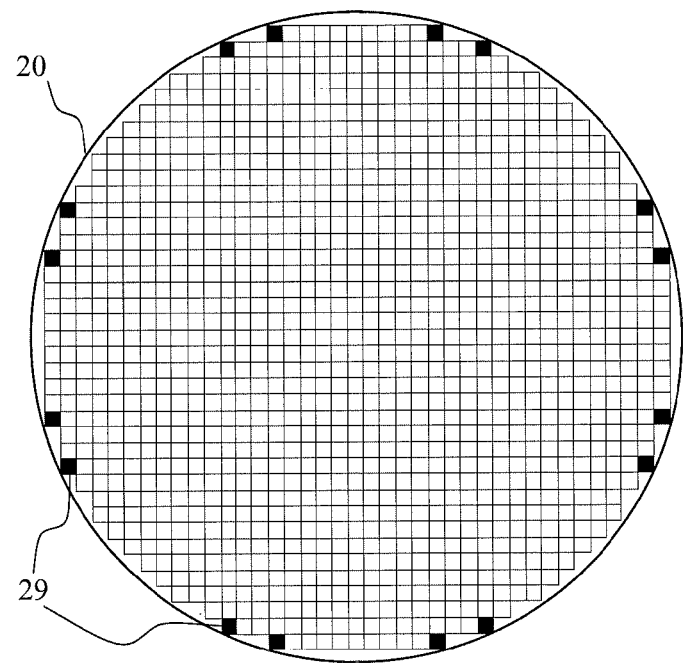
FIG. 16b shows an example of the usable die lost with the edge processing method and apparatus disclosed herein.

Current solvent dispense methods that are used to remove the photoresist edge bead are difficult to control. Using the system described herein, the edge exclusion width can be reduced from the current 3-5 mm to less than 1 mm. FIG. 16*a* shows an example of a wafer 20 with a 5.0 mm edge exclusion width. Any die that are intersected by the edge exclusion region are lost. In this example there are eighty lost die 28. Using an embodiment described herein, the edge exclusion width can be reduced to 0.6 mm, limited only by the accuracy of the beam placement, which is better than 0.1 mm. This results in only sixteen lost die 29, as shown in FIG. 16*b*.

In preferred embodiments the laser is a Nd:YAG laser and is configured to emit pulsed radiation at a wavelength of 355 nm, with a range of pulse repetition rates from 10,000 Hz to 100,000 Hz, which result in variable power levels and pulse energies. Other YAG lasers can be configured to emit radiation at other repetition rates in a range from 1,000 Hz to 500,000 Hz, and other wavelengths such as 213 nm, 266 nm, 532 nm, and 1064 nm. These characteristics may be beneficial to provide higher energy absorption by the material being processed, which leads to more complete reactions, higher throughput, and may enable processes that are ineffective at 355 nm. Other wavelengths, such as 193 nm, 248 nm, or 308 nm produced by an excimer laser, may be useful for certain applications. Still other applications may benefit from the use of a continuous wave (CW) laser such as a 364 nm argon ion laser.

Beam shaping optics may be used to alter the profile of the laser beam. In one embodiment, diffractive beam-shaping optics are used to produce a beam that has a top-hat profile in the scan direction but a Gaussian profile in the perpendicular direction. In another embodiment, diffractive beam-shaping optics are used to produce a rectangular beam that has a top-hat profile in both directions. In yet another embodiment, a homogenizer is used to create a uniform beam profile. By thus flattening the beam profile, wider process latitude, selective material removal, and sharper edge definition can be achieved.

One application of the systems and methods described herein is to eliminate problems that result after a sub-micron layer of photoresist is spin-coated onto a silicon wafer and baked. This process causes a thickened bead of photoresist at the wafer edge. To prevent peeling and de-lamination by the immersion fluid used in an imaging tool, such as the ASML 193 nm laser-based step-and-scan system, the resulting bead of photoresist on the edge of the wafer must be removed prior to the lithographic step. The present invention provides a method and apparatus for removing this edge bead. If the photoresist bead is not removed, the fluid flows over the wafer during exposure and undercuts the photoresist layer, causing it to lose adhesion, lift at the edges, break off, and re-deposit onto the wafer. This results in the loss of otherwise useable die. In addition, if this bead is not removed, it may stick to robotic handlers and transfer photoresist flakes to other tools and other wafers, causing tool downtime and die loss.

In an example of another application of photoresist edge-bead removal using the techniques herein, very thick coatings of 2.5 microns, for example, can be removed without leaving any detectable residue. In this application, a 0.6 mm wide edge bead from the top of the wafer was removed in less than 5 seconds of process time with a laser beam shaped into an elongated ellipse with an aspect ratio of greater than 10:1 and the long axis in the circumferential direction. This permits the laser beam to make a sharp slice into the thick photoresist coating, leaving behind a narrow transition between cleaned and uncleaned photoresist. The characteristics of this transition can be varied by changing the shape and edge profile of the incident laser beam. This photoresist edge bead removal application was carried out on a 200 mm wafer in open atmosphere with 355 nm radiation from the 3rd harmonic of a 12 W Nd:YAG (neodymium-doped yttrium aluminum garnet) laser pulsed at 17 kHz, a 0.1×1.5 mm Gaussian beam with 50% pulse-to-pulse overlap, a peak energy density of 350 mJ/cm$^2$, and a wafer spin rate of 1270 rpm.

In an example of another application, a tri-layer film is removed. This is a film stack that can be designed to minimize the reflections occurring during lithography, thereby permitting higher imaging resolution to produce advanced semiconductor devices. One example is a tri-layer film, successfully removed by the present invention, consists of an organic bottom anti-reflection coating (BARC), a middle silicon ARC layer, and a top layer of photoresist. This tri-layer film stack removal application was carried out on a 300 mm wafer in open atmosphere with 355 nm radiation from the 3rd harmonic of a 12 W Nd:YAG laser pulsed at 15 kHz, a 0.1×1.5 mm Gaussian beam with 50% pulse-to-pulse overlap, a peak energy density of 400 mJ/cm$^2$, and a wafer spin rate of 728 rpm. This process removes 1 mm of width in 8 seconds.

The laser edge-bead removal method and apparatus described herein permits a much better defined and sharper transition zone between removed and unremoved films than can be achieved with prior art using chemicals, plasma, or mechanical methods. More importantly, the ability to create a more sharply defined sidewall in the post-cleaned film provides more silicon area for useable die and can therefore increase die yield on each wafer, which can result in major revenue increases for semiconductor manufacturers.

In another application, a residue of polishing compound slurry is thermally encapsulated. Such residue is the result of a process called chemical mechanical polishing (CMP), used in multiple steps in the fabrication of semiconductor devices. CMP residue consists of unwanted granular particulates from polishing compounds, typically containing cerium oxide, which is harder than silicon. In the prior art, such residue is etched off using a four-step process, using first a mixture of ammonium hydroxide and hydrogen peroxide (SC1), then a mixture of sulfuric acid and hydrogen peroxide (SC2), followed by a de-ionized water rinse and a drying cycle. These mixtures are heated and are highly corrosive, so that special facilities are required, along with protective equipment for operators and special provisions for hazardous waste disposal.

In accordance with the embodiments described herein, one example of a process for removing this polishing residue uses a 3rd harmonic YAG laser delivering an energy density of 1000 to 2400 mJ/cm$^2$ to thermally encapsulate the slurry residue on the wafer edge by melting and re-flowing the silicon surface. This process typically takes 10 seconds to encapsulate 1 mm of the bottom edge of a 300 mm wafer. No corrosive chemicals, water, or drying cycles are required, and there is no hazardous waste as with the prior art methods cited above. In another example the beam is used at a lower energy density to permit the melting of only the areas of the wafer containing the residue while not melting the surrounding silicon surface.

In an example of another application, a post-etch polymer (PEP) residue is removed from the wafer edges. In this example, a reactive ion dry etching step leaves a thin PEP residue as a by-product of the etching process. This residue is extremely difficult to remove due to its chemical nature, being a Teflon-like chlorofluoropolymer. When these residues are present on the bottom side of the wafer, they cause warping of the wafer on a vacuum chuck resulting in image distortion during lithography. In an embodiment, a 1 mm annulus of these residues can be removed in 10 seconds on a 300 mm wafer using a 12 W, 3rd harmonic Nd:YAG laser with an energy density of 500 to 1200 mJ/cm$^2$. The process uses only air as the reactive gas mixture, operates at atmospheric pressure, and does not cause any heat build-up. Further, there is no detectable debris or by-products based on high magnification (150,000×) SEM analysis.

In an example of another application, a copper film is removed from the edge of a 300 mm silicon wafer. This application took 14 seconds per mm of copper removed, and was carried out in open atmosphere with 355 nm radiation from a 12 W, 3rd harmonic Nd:YAG laser pulsed at 22 kHz, a 0.25×0.17 mm Gaussian beam with 75% pulse-to-pulse overlap, a peak energy density of 1000 mJ/cm$^2$, and a wafer spin rate of 60 rpm.

In another application, organic and inorganic particles that are generated during semiconductor processing are removed. Particles from the robotic end effectors, wafer cassettes, ion implantation, or other sources during processing may end up on the wafer edge and need to be removed.

For a wide range of applications, laser energy densities used range from 150 to 2500 mJ/cm$^2$. Although 355 nm radiation, from the 3rd harmonic of a Nd:YAG laser, with a pulse width of 30 to 60 ns, is typically used, other wavelengths and other lasers can also be employed. One example is 532 nm radiation from the 2nd harmonic of a Nd:YAG laser, with 33% lower cost per watt. Alternatively, shorter wavelengths such as 266 nm radiation from the 4th harmonic of a Nd:YAG laser, or 193 nm radiation from an ArF excimer laser can be used to remove more difficult materials such as metals and oxides. Other examples of lasers that can be employed in the present invention include a continuous-wave (CW) argon-ion laser, a pulsed KrF excimer laser, and a 1 to 6 ns pulse-width Yb:YAG laser (ytterbium-doped yttrium aluminum garnet). For a given energy density, a shorter pulse width will result in a higher local, instantaneous substrate temperature. Since this higher temperature increases reactivity, it is advantageous in some applications to use a very short pulse-width laser. In light of the above disclosure, it will now be evident to those skilled in the art that a very wide variety of pulsed and CW, gas and solid-state lasers may be used.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims. While the preferred embodiment(s) of the present invention(s) are now shown and described, it is envisioned that those skilled in the art may devise various modifications without departing from the spirit and scope of the appended claims, and it is therefore only the claims that define the legal scope of this invention.

What is claimed is:

1. A method, comprising the steps of:
   mounting and rotating a substrate on a chuck;

generating a laser beam;
selecting a first one of three beam paths along which to deliver the laser beam at a first edge of the substrate;
selecting a second one of three beam paths along which to deliver the laser beam to a second edge of the substrate;
selecting a third one of three beam paths along which to deliver the laser beam to a third edge of the substrate;
the first, second and third edge of the substrate each comprising a different selected one of a top edge, apex edge, and bottom edge of the substrate selected in a predefined order;
providing a flow of a fluid in a vicinity of the first, second and third edges of the substrate while the first, second and third edges are being exposed to the laser beam;
thereby removing or transforming films, particles, or residues from or on the top edge, apex edge and bottom edge of the substrate in a single process step without removing the substrate from the chuck; and
exhausting by-products of the foregoing steps via the flow of fluid.

2. The method of claim 1 where a laser with a wavelength between 190 nm and 770 nm is used for generating the laser beam.

3. The method of claim 2 where the laser is a pulsed solid-state laser with wavelength between 350 nm and 360 nm.

4. The method of claim 1 where the laser beam has a Gaussian profile.

5. The method of claim 1 where the laser beam has a flat-top profile.

6. The method of claim 1 where the laser beam has a Gaussian profile on one axis and a flat-top profile on an orthogonal axis.

7. The method of claim 1 where the laser beam has an aspect ratio on the range of 1:1 to 20:1.

8. The method of claim 1 where the three beam paths have an equal optical path length.

9. The method of claim 1 where the fluid is an oxidizing gas.

10. The method of claim 1 where the fluid is a reducing gas.

11. The method of claim 1 where the fluid is air.

12. The method of claim 1 wherein a fiber-optical assembly is used for the step of selecting one of three beam paths for directing the beam at a given time.

13. The method of claim 1 additionally comprising:
using a galvanometric scanning mirror to direct the laser beam, on the selected one of the three selectable beam paths, in a direction substantially orthogonal to a selected edge.

14. The method of claim 13 further comprising:
applying a correction signal to said galvanometric scanning minor to compensate for an off-centered substrate.

15. The method of claim 1 further comprising enclosing the substrate and the rotating chuck in a chamber.

16. The method of claim 1 wherein the fluid is a reactive gas.

17. The method of claim 16 wherein the reactive gas is air.

18. The method of claim 1 wherein the exhausting step further comprises:
positioning an exhaust tube adjacent the substrate having a slot that envelops the top, apex, and bottom edges of the substrate.

19. The method of claim 1 wherein the film removed is a photoresist edge bead and the laser beam is generated at a wavelength of 355 nm with an energy density per pulse of 0.35 J/cm$^2$ and 50% pulse to pulse overlap.

20. The method of claim 1 wherein the residue removed is a Chemical Mechanical Polishing (CMP) residue and the laser beam is generated at an energy density per pulse of 1000 mJ/cm$^2$ to 2400 mJ/cm$^2$.

21. The method of claim 1 wherein the residue removed is a Post-Etch Polymer (PEP) and the laser beam is generated at an energy density per pulse of 500 mJ/cm$^2$ to 1200 mJ/cm$^2$.

22. The method of claim 1 wherein the film removed is a copper film and the laser beam is generated at a wavelength of 355 nm with a peak energy density per pulse of 1000 mJ/cm$^2$ and 75% pulse to pulse overlap.

* * * * *

UNITED STATES PATENT AND TRADEMARK OFFICE
CERTIFICATE OF CORRECTION

PATENT NO.        : 8,410,394 B2
APPLICATION NO.   : 13/034191
DATED             : April 2, 2013
INVENTOR(S)       : Millman, Jr. et al.

It is certified that error appears in the above-identified patent and that said Letters Patent is hereby corrected as shown below:

In the Specifications:

In col. 14, line 58 should read:
the exhaust tube 40. This configuration adds gas to the environment In col. 14, line 64 should read:
side of the exhaust tube 40, and fed by gas line 89 such that the gas In col. 15, line 53/54 should read:
otherwise it may be a vacuum chuck. Gas is fed into the chamber 90 through one or more gas injectors 94 and evacuated through In the Claims:

In col. 20, line 13 should read:
ning ~~minor~~ mirror to compensate for an off-centered substrate.

Signed and Sealed this
Eighteenth Day of June, 2013

Teresa Stanek Rea
*Acting Director of the United States Patent and Trademark Office*